United States Patent
Sato et al.

(10) Patent No.: US 10,040,967 B2
(45) Date of Patent: Aug. 7, 2018

(54) PHOTOSENSITIVE FILM, PHOTOSENSITIVE ELEMENT, CURED PRODUCT AND TOUCH PANEL

(71) Applicant: HITACHI CHEMICAL COMPANY, LTD., Tokyo (JP)

(72) Inventors: Mayumi Sato, Tokyo (JP); Koji Abe, Tokyo (JP); Hideo Takahashi, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 48 days.

(21) Appl. No.: 14/934,360

(22) Filed: Nov. 6, 2015

(65) Prior Publication Data

US 2017/0130088 A1 May 11, 2017

(51) Int. Cl.
 *B32B 3/10* (2006.01)
 *C09D 133/12* (2006.01)
 *G06F 3/044* (2006.01)

(52) U.S. Cl.
 CPC .......... *C09D 133/12* (2013.01); *G06F 3/044* (2013.01); *G06F 2203/04103* (2013.01); *G06F 2203/04111* (2013.01)

(58) Field of Classification Search
 None
 See application file for complete search history.

(56) References Cited

U.S. PATENT DOCUMENTS

2014/0335350 A1* 11/2014 Tanaka .................. G06F 3/044
 428/336

FOREIGN PATENT DOCUMENTS

| JP | H08-334862 A | 12/1996 |
|---|---|---|
| JP | 2004-323751 A | 11/2004 |
| JP | 2006-221099 A | 8/2006 |
| JP | 2006-307147 A | 11/2006 |
| JP | 2006-315960 A | 11/2006 |
| JP | 2008-146018 A | 6/2008 |
| JP | 2009-186510 A | 8/2009 |
| JP | 2011-048313 A | 3/2011 |
| JP | 2011-154700 A | 8/2011 |
| JP | 2012-018374 A | 1/2012 |
| JP | 2012-184371 A | 9/2012 |
| JP | 2012-220505 A | 11/2012 |
| JP | 2012-220837 A † | 11/2012 |
| JP | 2013-047296 A | 3/2013 |
| JP | 2013-076821 A | 4/2013 |
| JP | 2013-117669 A | 6/2013 |

(Continued)

OTHER PUBLICATIONS

Machine translation of WO 2011129210 retrieved on Jun. 26, 2017.*

(Continued)

*Primary Examiner* — Christopher Polley
(74) *Attorney, Agent, or Firm* — Fitch, Even, Tabin & Flannery, LLP

(57) ABSTRACT

A photosensitive film containing: a component (A): a binder polymer, a component (B): a photopolymerizable compound, and a component (C): a photopolymerization initiator, wherein the component (B) includes a di(meth)acrylate compound having at least one selected from the group consisting of a dicyclopentanyl structure and a dicyclopentenyl structure, and a thickness of the photosensitive film is 10 μm or less.

21 Claims, 11 Drawing Sheets

(56) References Cited

FOREIGN PATENT DOCUMENTS

| | | | |
|---|---|---|---|
| JP | 2013-140329 A | | 7/2013 |
| JP | 2013-174643 A | | 9/2013 |
| JP | 2013-189532 A | | 9/2013 |
| JP | 2013-195712 A | | 9/2013 |
| JP | 2013-200891 A | | 10/2013 |
| JP | 2013-210513 A | | 10/2013 |
| JP | 2013-217954 A | | 10/2013 |
| JP | 2014-206574 A | † | 10/2014 |
| JP | 2015-121929 A | | 7/2015 |
| WO | 2011/129210 A1 | † | 10/2011 |
| WO | WO 2011129210 A1 | * | 10/2011 ............... G02B 1/10 |
| WO | 2013/084873 A1 | | 4/2012 |
| WO | 2013/038624 A1 | | 3/2013 |
| WO | 2013/084284 A1 | | 6/2013 |
| WO | 2013/084883 A1 | † | 6/2013 |
| WO | WO 2013084883 A1 | * | 6/2013 ............. G06F 3/044 |

OTHER PUBLICATIONS

Web Sal'ence, "Salt Science Symposium 2012,"Seawater and Salt Sciences"", The Salt Science Research Foundation, 2013, No. 4, web, 2013, p. 1-p. 7 with English translation.

Web Sal'ence, "Report on the Salt Science Symposium 2012 "Seawater and Salt Sciences"", The Salt Science Research Foundation, No. 4, Jan. 24, 2013 with English translation.

Notification of Information Provision of JP Patent Application No. P2013-265214 dated Jan. 24, 2017. Document Number.

Office Action of JP Patent Application No. P2013-265214 dated Feb. 14, 2017.

Office Action in counterpart JP Appln. No. 2013-265214 dated Apr. 19, 2016.

Office Action of JP Appln. No. P2013-265214 dated Sep. 6, 2016.

Office Action of JP Appln. No. 2016-060737 dated Oct. 10, 2017.

Office Action of counterpart JP Patent Application No. P2013-265214 dated Aug. 22, 2017.

Office Action in counterpart JP Appln. No. 2013-265214 dated Aug. 2, 2016.

* cited by examiner
† cited by third party

PHOTOSENSITIVE FILM, PHOTOSENSITIVE ELEMENT, CURED PRODUCT AND TOUCH PANEL

TECHNICAL FIELD

The present invention relates to a photosensitive film, a photosensitive element, a cured product and a touch panel.

BACKGROUND

Liquid crystal display elements or touch panels (touch sensors) are used in display apparatuses of large electronic apparatuses such as personal computers and television sets; small electronic apparatuses such as car navigation systems, mobile phones, and electronic dictionaries; and OA and FA apparatuses. These liquid crystal display elements or touch panels are provided with electrodes composed of transparent conductive electrode materials. ITO (indium-tin-oxide), indium oxide, tin oxide or the like is known as a transparent conductive electrode material, and these materials exhibit high visible light transmittance, and therefore are predominant as a transparent electrode material of substrates for liquid crystal display elements and the like.

Various types of touch panels have already been practically used, and recently, use of capacitive touch panels has been developed. In the capacitive touch panels, when a fingertip as a conductor gets in touch with a touch input screen, capacitive coupling occurs between the fingertip and the conductive film to form a capacitor. Accordingly, the capacitive touch panel senses a change in charge in the touch position of the fingertip to detect its coordinate.

In particular, because projected capacitive touch panels can detect the fingertip at several points, the projected capacitive touch panels have excellent operability enabling performance of complex instructions, according to such excellent operability, the projected capacitive touch panels has been developed for using as input devices on display surfaces in apparatuses having small display devices, such as mobile phones and portable music players.

In general, in the projected capacitive touch panels, a plurality of X electrodes and a plurality of Y electrodes orthogonal to the X electrodes are formed into a two-layer structure to express a two-dimensional coordinate of an X-axis and a Y-axis, and as the constituent material for these electrodes, ITO (Indium-Tin-Oxide) is used.

The frame regions of the touch panels are regions in which the touch location cannot be detected. Therefore, a reduction in the area of such frame region is an important factor to increase the product value. The frame region requires metal wiring to transmit the detection signal of the touch location. The width of the metal wiring needs to be reduced to reduce the frame area. In general, copper is used for the metal wiring because the conductivity of ITO is not sufficiently high.

However, in the touch panels as described above, corrosive components such as moisture and salt may intrude inward from the sensing regions when the touch panels are in contact with the fingertip. If corrosive components intrude into the touch panels, the metal wiring may corrode to increase the electric resistance between the electrodes and driving circuits or cause disconnection.

As a method of disposing a resist film at a necessary portion in order to prevent the corrosion of metal wiring, there is a known method in which a photosensitive layer composed of a photosensitive resin composition is provided on a predetermined base material, and this photosensitive layer is exposed and developed (for example, Patent Literature 1 below).

CITATION LIST

Patent Literature

[Patent Literature 1] International Publication No. WO 2013/084873

SUMMARY

In the method described in foregoing Patent Literature, by using a photopolymerizable compound having three or more ethylenically unsaturated groups, the compatibility between high transparency and rust preventive property has been achieved; however, there is room for improvement in the composition using the aforementioned photopolymerizable compound for the purpose of achieving the compatibility between rust preventive property and moisture permeability.

An object of the present invention is to provide a photosensitive film capable of obtaining a cured product being excellent in transparency, and having sufficiently low moisture permeability and sufficient rust preventive property (the property to prevent rust of the metal coated with the cured product) even when the thickness is thin. An object of the present invention is to provide a photosensitive element comprising such a photosensitive film. An object of the present invention is to provide a cured product obtained by using the photosensitive film. An object of the present invention is to provide a touch panel comprising a cured product being excellent in transparency, and having sufficiently low moisture permeability and sufficient rust preventive property even when the thickness is thin.

The present inventors made a diligent study in order to solve the above problems, consequently have found that a cured product (such as a cured film) formed by using a photosensitive resin composition containing a specific photopolymerizable compound exhibits sufficiently low moisture permeability and sufficient rust preventive property, and thus have completed the present invention. The specific aspects thereof are as follows.

A first embodiment of the present invention provides a photosensitive film containing a component (A): a binder polymer, a component (B): a photopolymerizable compound, and a component (C): a photopolymerization initiator, wherein the component (B) includes a di(meth)acrylate compound having at least one selected from the group consisting of a dicyclopentanyl structure and a dicyclopentenyl structure, and the thickness of the photosensitive film is 10 μm or less. According to such a photosensitive film, it is possible to obtain a cured product being excellent in transparency and having sufficiently low moisture permeability and sufficient rust preventive property even when the thickness is thin.

In addition, the first embodiment of the present invention provides a photosensitive element comprising a support film and the photosensitive film, wherein the photosensitive film is disposed on the support film. The first embodiment of the present invention provides a cured product of the photosensitive film. The first embodiment of the present invention provides a touch panel comprising a base material, and a cured product of the photosensitive film, wherein the cured product is disposed on the base material.

The second embodiment of the present invention provides a touch panel comprising a base material, and a cured product of a photosensitive resin composition, wherein the cured product is disposed on the base material, the photosensitive resin composition contains the component (A): a binder polymer, the component (B): a photopolymerizable compound, and the component (C): a photopolymerization initiator, and the component (B) includes a di(meth)acrylate compound having at least one selected from the group consisting of a dicyclopentanyl structure and a dicyclopentenyl structure. Such a touch panel comprises a cured product being excellent in transparency, and having sufficiently low moisture permeability and sufficient rust preventive property even when the thickness is thin.

The present inventors think that the reasons why the present invention can achieve the above effects are as follows. When the thickness of the cured product (such as a cured film) is thin, corrosive components readily intrude into the electrodes for a touch panel. In contrast to this, the present inventors infer that the component (B) includes the di(meth)acrylate compound having a dicyclopentanyl structure or a dicyclopentenyl structure, accordingly the cured state of the cured product after exposure can be made dense, and therefore the above effects are obtained.

In each of the embodiments, the di(meth)acrylate compound may be a compound represented by the following general formula (1).

[Chemical Formula 1]

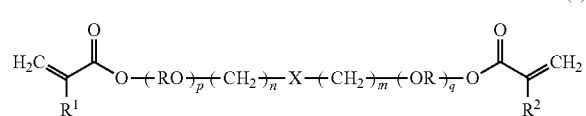

(1)

[In the general formula (1), X represents a dicyclopentanyl structure or a dicyclopentenyl structure; R each independently represents an alkylene group having 1 to 4 carbon atoms; $R^1$ and $R^2$ each independently represent a hydrogen atom or a methyl group; n and m each independently represent 0 to 2; and p+q is 0 to 10.]

In each of the embodiments, the di(meth)acrylate compound may include at least one compound selected from the group consisting of dimethylol tricyclodecane di(meth)acrylate and tricyclodecanediol di(meth)acrylate.

Each of the embodiments may be an aspect further using at least one compound selected from the group consisting of a triazole compound, a thiadiazole compound and a tetrazole compound.

In each of the embodiments, the component (C) may include an oxime ester compound.

Considering the visibility or good appearance of the touch panel, it is desired that the transparency of the cured product (such as a cured film) have higher transparency. However, the present inventors have also found that resolution property tends to reduce if a highly transparent thin photosensitive layer is patterned. With respect to the reason for this, the present inventors think that, as the thickness of the photosensitive layer is reduced, it is readily affected by light scattering from the base material coated with the cured product of the photosensitive layer, and halation occurs.

In contrast, in the present invention, the photopolymerization initiator (the component (C)) includes an oxime ester compound, thereby enabling formation of a pattern with sufficient resolution.

The present inventors infer the reason why the above effect is obtained as follows: the oxime moiety contained in the oxime ester compound has relatively high photodecomposition efficiency and has a suitable threshold such that decomposition does not occur with a small amount of leaked light, and therefore, the influences by the leaked light is prevented.

The present invention can obtain a cured product being excellent in transparency, and having sufficiently low moisture permeability and sufficient rust preventive property even when the thickness is thin.

In addition, the present invention can provide a method of manufacturing a base material for a touch panel provided with a cured product having a desired shape, being excellent in transparency, and capable of having sufficiently low moisture permeability and sufficient rust preventive property even in the case of thin film, a photosensitive resin composition and a photosensitive element used therein, and a touch panel comprising the base material for a touch panel provided with the cured product. The present invention can provide a method of reducing rust of transparent electrodes.

BRIEF DESCRIPTION OF THE DRAWINGS

FIG. 9A is a partially cutout perspective view illustrating a substrate comprising transparent electrodes, and FIG. 9B is a partially cutout perspective view illustrating the resulting capacitive touch panel.

FIG. 10A is a partial sectional view taken along line VIIIa-VIIIa in FIG. 9, FIG. 10B is a partial sectional view illustrating a step of disposing an insulation film, and FIG. 10C is a partial sectional view taken along line VIIIc-VIIIc in FIG. 9.

DETAILED DESCRIPTION

Embodiments for implementing the present invention are now described in detail. However, the present invention is not limited to the embodiments below.

Throughout the specification, "(meth)acrylic acid" indicates acrylic acid or methacrylic acid, and "(meth)acrylate" indicates acrylate or the methacrylate corresponding thereto.

Throughout the specification, the term "step" involves not only independent steps, but also cases which are not clearly distinguished from other steps but attain intended action of the steps. Throughout the specification, the numeric range specified using the term "to" indicates a range in which the numeric values before and after the term "to" are inclusive as the lower limit and the upper limit, respectively. "A or B" indicates at least the case where either one of A and B is involved, or alternatively may include the case where both of A and B are involved.

Throughout the specification, if a plurality of substances corresponding to each component are present in the composition, the content of each component in the composition indicates the total amount of a plurality of such substances present in the composition, unless otherwise specified.

Throughout the specification, the cured product (such as a cured film) of the base material for a touch panel provided with a cured product can be disposed on a sensing region having electrodes, a frame region having metal wiring, or other regions. The cured product of the base material for a touch panel provided with a cured product may be disposed on only any of the regions, or may be disposed on two or more of the regions. The position and range of the cured product disposed can be appropriately selected according to the purpose of use thereof or the like; for example, the cured product can be disposed on part of electrodes formed in the sensing region.

<Photosensitive Film and Photosensitive Element>

The photosensitive film of the present embodiment contains the component (A): a binder polymer, the component (B): a photopolymerizable compound, and the component (C): a photopolymerization initiator, wherein the component (B) includes a di(meth)acrylate compound having at least one selected from the group consisting of a dicyclopentanyl structure and a dicyclopentenyl structure. The photosensitive film of the present embodiment is consisted of the photosensitive resin composition of the present embodiment, wherein the photosensitive resin composition contains the components (A) to (C). The photosensitive element of the present embodiment comprises a support film and the photosensitive film of the present embodiment, wherein the photosensitive film is disposed on the support film.

Figure 1:
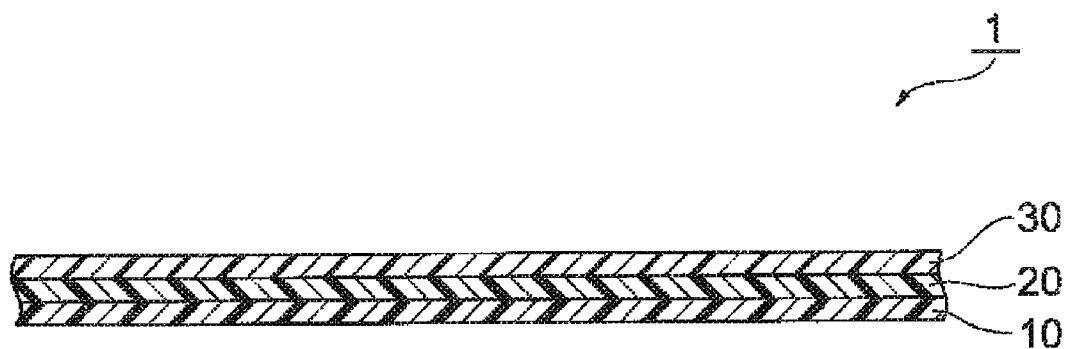
FIG. 1 is a schematic sectional view illustrating one embodiment of the photosensitive element of the present invention.

FIG. 1 is a schematic sectional view illustrating the photosensitive element of the present embodiment. The photosensitive element 1 illustrated in FIG. 1 is composed of a support film 10, a photosensitive layer (a photosensitive film or a photosensitive resin composition layer) 20 disposed on the support film 10, and a protective film 30 disposed on the side of the photosensitive layer 20 opposite to the support film 10. The photosensitive layer 20 contains the photosensitive resin composition of the present embodiment.

The photosensitive resin composition, the photosensitive film and the photosensitive element of the present embodiment can be suitably used to form a cured product (such as a cured film) of the base material for a touch panel provided with a cured product. According to the photosensitive resin composition, the photosensitive film and the photosensitive element of the present embodiment, the rust on the transparent electrodes can be effectively prevented.

As the support film 10, a polymer film can be used. Examples of the polymer film include polyethylene terephthalate film, polycarbonate film, polyethylene film, polypropylene film, and polyether sulfone film.

The thickness of the support film 10 is preferably 5 to 100 µm, more preferably 10 to 70 µm, further preferably 15 to 60 µm, particularly preferably 20 to 50 µm from the viewpoint of ensuring the coating properties and preventing a reduction in resolution during exposure through the support film.

The photosensitive resin composition forming the photosensitive layer 20 contains the component (A): a binder polymer, the component (B): a photopolymerizable compound, and the component (C): a photopolymerization initiator, wherein the component (B) includes a di(meth)acrylate compound having at least one selected from the group consisting of a dicyclopentanyl structure and a dicyclopentenyl structure.

According to the photosensitive resin composition, the photosensitive film and the photosensitive element of the present embodiment, it is possible to form a cured product (such as a cured film) having sufficiently low moisture permeability and high rust preventive property even when the thickness is 10 µm or less.

(Component (A))

As the binder polymer of the component (A), for example, a polymer having a carboxyl group can be used. In this case, the portion other than the photocured portion (the cured product portion after the active light irradiation) of the photosensitive layer can be easily removed by alkali development. If the portion other than the predetermined portion (the photocured portion) above is removed by, for example, punching without using the development step such as the alkali development, the component (A) may have no carboxyl group.

In the embodiment, as the component (A), a copolymer is suitable which has (a) the constituent unit (structural unit, the same applies hereafter) derived from (meth)acrylic acid, and (b) the constituent unit derived from alkyl (meth)acrylate. The component (A) may be used singly or in combination of two or more.

Examples of the alkyl (meth)acrylate include methyl (meth)acrylate, ethyl (meth)acrylate, butyl (meth)acrylate, 2-ethylhexyl (meth)acrylate, and hydroxylethyl (meth)acrylate. Alkyl (meth)acrylate may be used singly or in combination of two or more.

The copolymer may further have constituent units derived from other monomers copolymerizable with the component (a) or the component (b).

Examples of the other monomers copolymerizable with the component (a) or the component (b) include: dicyclopentanyl (meth)acrylate, dicyclopentenyl (meth)acrylate, isobornyl (meth)acrylate, adamantyl (meth)acrylate, dicyclopentenyloxyethyl (meth)acrylate, dicyclopentanyloxyethyl (meth)acrylate, isobornyloxyethyl (meth)acryate, cyclohexyloxyethyl (meth)acrylate, adamantyloxyethyl (meth)acrylate, dicyclopentenyloxypropyloxyethyl (meth)acrylate, dicyclopentanyloxypropyloxyethyl (meth)acrylate, dicyclopentenyloxypropyloxyethyl (meth)acrylate, adamantyloxypropyloxyethyl (meth)acrylate, tetrahydrofurfuryl (meth)acrylate, dimethylaminoethyl (meth)acrylate, diethylaminoethyl (meth)acrylate, glycidyl (meth)acrylate, benzyl (meth)acrylate, phenoxy (meth)acrylate, 2,2,2-trifluoroethyl (meth)acrylate, 2,2,3,3-tetrafluoropropyl (meth)acrylate, (meth)acrylamide, (meth)acrylonitrile, diacetone (meth) acrylamide, styrene, and vinyltoluene. When a binder polymer as the component (A) is synthesized, the monomer above may be used singly or in combination of two or more.

The weight average molecular weight of the binder polymer is preferably 10000 to 200000, more preferably 15000 to 150000, further preferably 30000 to 150000, particularly preferably 30000 to 100000, extremely preferably 40000 to 100000, from the viewpoint that the resolution is excellent. The weight average molecular weight can be measured under the same conditions as those in Examples of the specification of the present application.

The acid value of the binder polymer is preferably 75 mgKOH/g or more from the viewpoint that a cured product (such as a cured film) having a desired shape is easily formed. The acid value of the binder polymer is more preferably 75 to 200 mgKOH/g, further preferably 75 to 150 mgKOH/g, particularly preferably 75 to 120 mgKOH/g, from the viewpoint of the achievement of the compatibility between the easiness in controlling the shape of the cured product (such as a cured film) and the rust preventive property of the cured product (such as a cured film)

The acid value of the binder polymer as the component (A) can be measured as follows.

Namely, first, 1 g of the binder polymer whose acid value is to be measured is precisely weighed. To the precisely weighed binder polymer, 30 g of acetone is added to uniformly dissolve the polymer. Next, a proper amount of phenolphthalein as an indicator is added to the solution, and titration is performed with a 0.1N aqueous solution of potassium hydroxide (KOH). Then, the acid value is calculated from the following expression:

acid value=$0.1 \times Vf \times 56.1/(Wp \times I/100)$

In the expression, Vf represents the volume (mL) of the aqueous solution of KOH used in titration; Wp represents the mass (g) of the solution containing the binder polymer as a measurement object; I represents the proportion (% by mass) of the non-volatile component in the solution containing the binder polymer to be measured. If the binder polymer is mixed in a state of being mixed with a volatile component such as a synthesis solvent or a dilution solvent, preheating is performed before precise weighing at a temperature of 10° C. higher than the boiling point of the volatile component for 1 to 4 hours to remove the volatile component, and then the acid value is measured.

The hydroxyl value of the binder polymer as the component (A) is preferably 50 mgKOH/g or less, more preferably 45 mgKOH/g or less from the viewpoint of further enhancement in rust preventive property.

The hydroxyl value of the component (A) can be measured as follows.

First, 1 g of the binder polymer whose hydroxyl value is to be measured is precisely weighed. To the precisely weighed binder polymer, 10 mL of a 10% by mass solution of acetic anhydride in pyridine is added to uniformly dissolve the polymer, and heating is performed at 100° C. for 1 hour. After heating, 10 mL of water and 10 mL of pyridine are added, and heating is performed at 100° C. for 10 minutes. Subsequently, neutralization titration is performed with the ethanol solution of 0.5 mol/L potassium hydroxide using an automatic titrator ("COM-1700" manufactured by Hiranuma Sangyo Co., Ltd.) to measure the hydroxyl value. The hydroxyl value can be calculated from the following expression:

hydroxyl value=$(A-B) \times f \times 28.05$/sample (g)+acid value

In the expression, A represents the volume (mL) of the ethanol solution of 0.5 mol/L potassium hydroxide used in the blank test; B represents the volume (mL) of the ethanol solution of 0.5 mol/L potassium hydroxide used in titration; and f represents a factor. If the binder polymer is mixed in a state of being mixed with a volatile component such as a synthesis solvent or a dilution solvent, preheating is performed before precise weighing at a temperature of 10° C. higher than the boiling point of the volatile component (the synthesis solvent, the dilution solvent or the like) for 1 to 4 hours to remove the volatile component (the aforementioned solvent or the like), and then the hydroxyl value is measured.

(Component (B))

The photopolymerizable compound as the component (B) includes a di(meth)acrylate compound having at least one selected from the group consisting of a dicyclopentanyl structure and a dicyclopentenyl structure. The component (B) may be used singly or in combination of two or more. It is preferred that the component (B) includes the compound represented by the following general formula (1) in order to prevent the intrusion of moisture and to further reduce the moisture permeability.

[Chemical Formula 2]

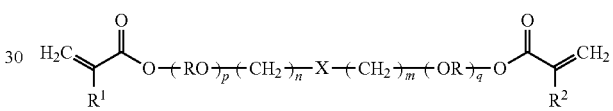

(1)

[In the general formula (1), X represents a dicyclopentanyl structure or a dicyclopentenyl structure. R each independently represents an alkylene group having 1 to 4 carbon atoms. $R^1$ and $R^2$ each independently represent a hydrogen atom or a methyl group. n and m each independently represent 0 to 2. p+q is 0 to 10.]

According to the compound represented by the general formula (1) above, the dicyclopentanyl structure or the dicyclopentenyl structure included in X has a bulky structure, and therefore, the physical interaction after photocuring allows the compatibility between low moisture permeability and high rust preventive property to be achieved.

In the general formula (1) above, R represents an alkylene group having 1 to 4 carbon atoms. R is preferably an ethylene group or a propylene group, more preferably an ethylene group. The propylene group may be either of a n-propylene group and an isopropylene group.

In the general formula (1) above, n and m each represent 0 to 2. Here, n and m indicate to what extent the alkylene group having 1 to 4 carbon atoms is added in the molecule. Therefore, n and m represent integer values in a single molecule, but represent rational numbers as average values in an aggregate of two or more types of molecules.

In the general formula (1) above, the sum of p and q is 0 to 10 (p+q=0 to 10). p and q each independently represent 0 to 10. Here, p and q indicate to what extent the oxyalkylene group is added in the molecule. Therefore, p and q represent integer values in a single molecule, but represent rational numbers as average values in an aggregate of two or more types of molecules.

It is preferred that the di(meth)acrylate compound as the component (B) includes, as the compound represented by the general formula (1) above, at least one compound selected from the group consisting of dimethylol tricyclodecane di(meth)acrylate and tricyclodecanediol di(meth) acrylate. These are commercially available as NK Ester DCP and NK Ester A-DCP (both manufactured by Shin-Nakamura Chemical Co., Ltd.).

In the photopolymerizable compound as the component (B), for example, a monofunctional vinyl monomer, a bifunctional vinyl monomer, or a polyfunctional vinyl monomer having three or more ethylenically unsaturated groups may also be mixed, in addition to the compound represented by the general formula (1) above.

Examples of the aforementioned monofunctional vinyl monomer include the monomers shown as the examples of the monomers used in the synthesis of the copolymers which are suitable examples of the component (A).

Examples of the aforementioned bifunctional monomer include polyethylene glycol di(meth)acrylate, trimethylolpropane di(meth)acrylate, polypropylene glycol di(meth) acrylate, bisphenol A polyoxyethylene polyoxypropylene di(meth)acrylate, 2,2-bis(4-(meth)acryloxypolyethoxypolypropoxyphenyl)propane, and bisphenol A diglycidyl ether di(meth)acrylate.

Example of the aforementioned polyfunctional vinyl monomer having three or more ethylenically unsaturated groups include: compounds obtained by allowing polyhydric alcohols such as glycerol or pentaerythritol to react with α,β-unsaturated carboxylic acids, such as ditrimethylolpropane tetra(meth)acrylate, trimethylolpropane tri(meth)acrylate, tetramethylolmethane tri(meth)acrylate, tetramethylolmethane tetra(meth)acrylate, dipentaerythritol penta(meth) acrylate, and dipentaerithrytol hexa(meth)acrylate; and compounds obtained by adding α,β-unsaturated carboxylic acids to glycidyl group-containing compounds, such as trimethylolpropane triglycidyl ether triacrylate.

Among these, polyfunctional vinyl monomers having three or more ethylenically unsaturated groups are preferable.

If a polyfunctional vinyl monomer having three or more ethylenically unsaturated groups and a compound represented by the general formula (1) above are used in combination, the proportions are not particularly limited; however, from the viewpoint of obtaining further excellent photocurability, low moisture permeability and rust preventive property, the proportion of the polyfunctional vinyl monomer having three or more ethylenically unsaturated groups is preferably 10 parts by mass, more preferably 20 parts by mass or more with respect to 100 parts by mass of the component (B) (the total amount of the photopolymerizable compounds contained in the photosensitive resin composition).

The content of the component (A) and the component (B), with respect to 100 parts by mass of the total amount of the component (A) and the component (B), is preferably the case that the contents of the component (A) and the component (B) are 35 to 85 parts by mass and 15 to 65 parts by mass, respectively; more preferably the case that the contents of the component (A) and the component (B) are 40 to 80 parts by mass and 20 to 60 parts by mass, respectively; further preferably the case that the contents of the component (A) and the component (B) are 50 to 70 parts by mass and 30 to 50 parts by mass, respectively; and particularly preferably the case that the contents of the component (A) and the component (B) are 55 to 65 parts by mass and 35 to 45 parts by mass, respectively.

By allowing the contents of the component (A) and the component (B) to fall within the aforementioned ranges, while the application property or the film property (the film property of the photosensitive film or the photosensitive element) is being ensured, sufficient sensitivity is obtained, and it is possible to sufficiently ensure photocurability, developability, low moisture permeability and rust preventive property.

(Component (C))

It is preferable that the photosensitive resin composition or the photosensitive film of the present embodiment contain an oxime ester compound as the photopolymerization initiator which is the component (C). As the oxime ester compound, it is more preferably at least one compound selected from the group consisting of the compound represented by the general formula (2) below, the compound represented by the general formula (3) below and the compound represented by the general formula (4) below. By using such a compound, on the base material, it is possible to easily form a cured product (such as a cured film) having sufficient rust preventive property even when the thickness is thin (for example, in the case of thin film) This cured product (such as a cured film) is also sufficiently excellent in transparency. The component (C) may be used singly or in combination of two or more.

[Chemical Formula 3]

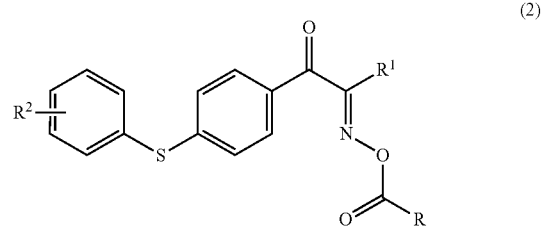

(2)

In the general formula (2) above, R and $R^1$ each represent an alkyl group having 1 to 12 carbon atoms, a cycloalkyl group having 4 to 10 carbon atoms, a phenyl group or a tolyl group; however, R and $R^1$ are each preferably an alkyl group having 1 to 8 carbon atoms, a cycloalkyl group having 4 to 6 carbon atoms, a phenyl group or a tolyl group, more preferably an alkyl group having 1 to 4 carbon atoms, a cycloalkyl group having 4 to 6 carbon atoms, a phenyl group or a tolyl group, further preferably a methyl group, a cyclopentyl group, a phenyl group or a tolyl group.

$R^2$ represents non-substitution, OH, COOH, O(CH$_2$)OH, O(CH$_2$)$_2$OH, COO(CH$_2$)OH or COO(CH$_2$)$_2$OH, but is preferably non-substitution, O(CH$_2$)OH, O(CH$_2$)$_2$OH, COO (CH$_2$)OH or COO(CH$_2$)$_2$OH, more preferably non-substitution, O(CH$_2$)$_2$OH or COO(CH$_2$)$_2$OH.

[Chemical Formula 4]

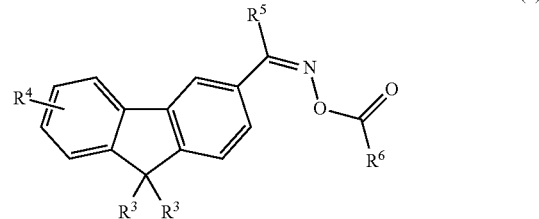

(3)

In the general formula (3) above, $R^3$ represents an alkyl group having 1 to 6 carbon atom, and $R^3$ is preferably a propyl group. $R^4$ represents NO$_2$ or ArCO. Ar represents an aryl group, and a tolyl group is preferable as Ar. $R^5$ and $R^6$ each represent an alkyl group having 1 to 12 carbon atoms, a phenyl group or a tolyl group, and are each preferably a methyl group, a phenyl group or a tolyl group.

[Chemical Formula 5]

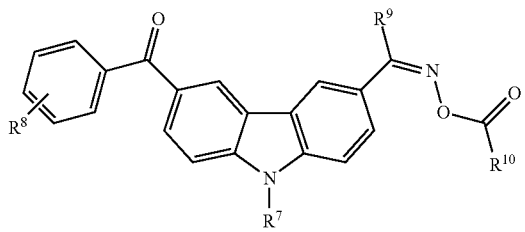

(4)

In the general formula (4) above, $R^7$ represents an alkyl group having 1 to 6 carbon atoms, and is preferably an ethyl group. $R^8$ is an organic group having an acetal bond, and is preferably a substituent possessed by the compound represented by the formula (4-1) below. $R^9$ and $R^{10}$ are each an alkyl group having 1 to 12 carbon atoms, a phenyl group or a tolyl group, and are each preferably a methyl group, a phenyl group or a tolyl group, more preferably a methyl group.

Examples of the compound represented by the general formula (2) above include the compound represented by the formula (2-1) below. This can be available as Adeka Arkls NCI-930 (trade name, manufactured by Adeka Corp.).

[Chemical Formula 6]

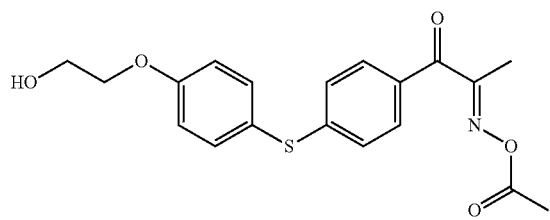

(2-1)

Examples of the compound represented by the general formula (3) above include the compound represented by the formula (3-1) below and the compound represented by the formula (3-2) below. These compounds are available as DFI-091 and DFI-020 (trade names, both manufactured by Daito Chemix Corp.), respectively.

[Chemical Formula 7]

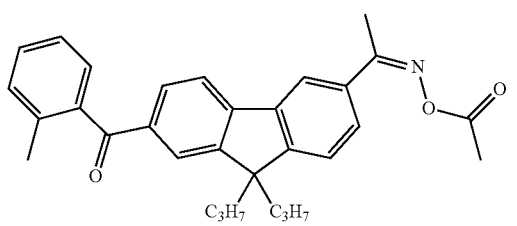

(3-1)

[Chemical Formula 8]

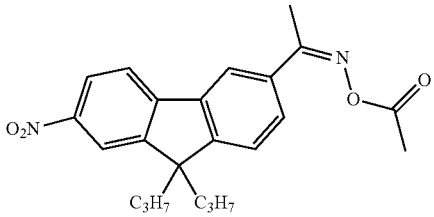

(3-2)

Examples of the compound represented by the general formula (4) above include the compound represented by the formula (4-1) below. This is available as Adeka Optomer N-1919 (trade name, manufactured by Adeka Corp.).

[Chemical Formula 9]

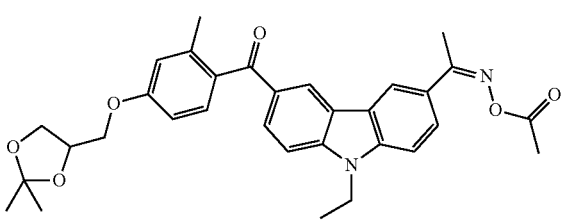

(4-1)

As the photopolymerization initiator, a photopolymerization initiator other than the aforementioned oxime ester compound (the compound represented by the general formula (2) above, the compound represented by the general formula (3) above, or the compound represented by the general formula (4) above) can also be used in combination. Examples of such a photopolymerization initiator include: aromatic ketones such as benzophenone, 4-methoxy-4,4'-dimethylaminobenzophenone, 2-benzyl-2-dimethylamino-1-(4-morpholinophenyl)-1-butanone, and 2-methyl-1-[4-(methylthio)phenyl]-2-morpholino-1-propane; benzoin ether compounds such as benzoin methyl ether, benzoin ethyl ether and benzoin phenyl ether; benzoin compounds such as benzoin, methylbenzoin and ethylbenzoin; benzil derivatives such as benzil dimethyl ketal; acridine derivatives such as 9-phenylacridine and 1,7-bis(9,9'-acridinyl)heptane; N-phenylglycine; N-phenylglycine derivatives; coumarin-based compounds; thioxanthone-based compounds such as 2-chlorothioxanthone, 2-methylthioxanthone, 2,4-dimethylthioxanthone, isopropylthioxanthone, 2,4-dichlorothioxanthone, 2,4-diethylthioxanthone, and 2,4-diisopropylthioxanthone; tertiary amine compounds; and oxazole-based compounds. Also, a thioxanthone-based compound and a tertiary amine compound may also be combined as in the case of a combination of diethylthioxanthone and dimethylaminobenzoic acid.

The content of the photopolymerization initiator as the component (C) is preferably 0.1 to 20 parts by mass, more preferably 0.5 to 10 parts by mass, further preferably 0.5 to 5 parts by mass with respect to 100 parts by mass of the total amount of the component (A) and the component (B). The content of the component (C) is preferably 0.1 part by mass or more from the viewpoint that the photosensitivity and the resolution are excellent, and preferably 20 parts by mass or less from the viewpoint that the visible light transmittance is further excellent.

(Component (D))

It is preferred that the photosensitive resin composition or the photosensitive film of the present embodiment further contains at least one compound selected from the group consisting of a triazole compound, a thiadiazole compound and a tetrazole compound (hereinafter, also referred to as the component (D), exclusive of the compounds corresponding to the components (A) to (C)). This enables to easily prevent the lowering of the moisture permeability, and additionally to form a cured product (such as a cured film) having further excellent rust preventive property owing to the enhancement of the rust preventive property due to the protection of metal (such as copper). From the viewpoint of a further enhancement of the rust preventive property of the cured product (such as a cured film), it is more preferably at least one selected from the group consisting of a triazole compound having a mercapto group, a tetrazole compound having a mercapto group, a thiadiazole compound having a mercapto group, a triazole compound having an amino group, and a tetrazole compound having an amino group. The component (D) may be used singly or in combination of two or more.

Among these, a tetrazole compound having an amino group is preferable. Specifically, examples include a compound represented by the general formula (D-1) below.

[Chemical Formula 10]

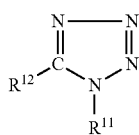

(D-1)

In the general formula (D-1) above, $R^{11}$ and $R^{12}$ each independently represent a hydrogen atom, an alkyl group having 1 to 20 carbon atoms, an amino group, a mercapto group or a carboxymethyl group, and at least one of $R^{11}$ and $R^{12}$ has an amino group.

Among the tetrazole compounds represented by the general formula (D-1) above, it is preferably at least one selected from the group consisting of 5-amino-1H-tetrazole, 1-methyl-5-amino-tetrazole, 1-methyl-5-mercapto-1H-tetrazole, and 1-carboxymethyl-5-amino-tetrazole.

The tetrazole compound represented by the general formula (D-1) above is also suitably a water-soluble salt. Specific examples include alkali metal salts (for example, salts of sodium, potassium and lithium) of 1-methyl-5-amino-tetrazole.

Among these, from the viewpoint of being further excellent in adhesion to metal electrodes, ease of development, or transparency, it is preferably at least one selected from the group consisting of 5-amino-1H-tetrazole and 1-methyl-5-mercapto-1H-tetrazole.

These tetrazole compounds may be used singly or in combination of two or more.

The content of the component (D) is preferably 0.05 to 10.0 parts by mass, more preferably 0.1 to 2.0 parts by mass, further preferably 0.2 to 1.0 part by mass with respect to 100 parts by mass of the total amount of the component (A) and the component (B).

(Component (E))

If a cured film is disposed on part of the ITO electrode of the touch panel (for example, if a cured film is not formed in the sensing region, but a cured film is disposed on the ITO electrode in the frame region and on the portion in which a metal layer (copper layer or the like) is formed on the ITO electrode), a photosensitive layer is entirely disposed, and then exposure and development are performed to allow the unnecessary portion to be removed. In this case, the photosensitive layer is required to have sufficient adhesiveness to the electrode to be protected, and to have satisfactory developability in such a way that no undevelopment occurs in the unnecessary portion. From the viewpoint of achieving the compatibility between the adhesiveness and the developability in such a case, it is preferred that the photosensitive resin composition or the photosensitive film of the present embodiment contains a phosphoric acid ester (hereinafter, also referred to as the "component (E)") having a photopolymerizable unsaturated bond. The component (E) may be used singly or in combination of two or more.

From the viewpoint that the compatibility between the adhesiveness to the ITO electrode and the developability is achieved at a high level while sufficiently ensuring the rust preventive property of the cured product (such as a cured film) to be formed, it is preferred that a compound having the following structure is used as the component (E) (the phosphoric acid ester having a photopolymerizable unsaturated bond). As such a compound, a commercial product such as PM21 (manufactured by Nippon Kayaku Co., Ltd.) is available.

[Chemical Formula 11]

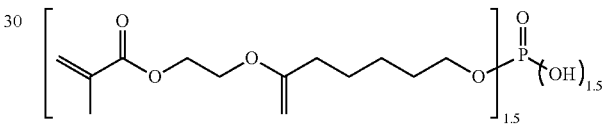

(Other Components)

The photosensitive resin composition or the photosensitive film of the present embodiment can contain, if necessary, other components such as an adhesion-imparting agent (such as a silane coupling agent), a leveling agent, a plasticizer, a filler, an antifoaming agent, a frame retardant, a stabilizer, an antioxidant, a fragrance, a thermal crosslinking agent, and a polymerization inhibitor, each in an amount of about 0.01 to 20 parts by mass with respect to 100 parts by mass of the total amount of the component (A) and the component (B). These may be used singly or in combination of two or more.

Here, the visible light transmittance of the cured product of the photosensitive resin composition is determined as follows. First, the coating solution containing the photosensitive resin composition is applied onto a support film in a dry thickness of 10 μm or less, and is dried to form a photosensitive layer (a photosensitive resin composition layer, a photosensitive film) Next, lamination is performed with a laminator in such a way that the photosensitive layer (the photosensitive resin composition layer, a photosensitive film) is brought into contact with the glass substrate. Thus, a sample for measurement having the photosensitive layer and the support film laminated on the glass substrate is obtained. Next, the obtained sample for measurement is irradiated with ultraviolet light to photo-cure the photosensitive layer, and then the transmittance in a measurement wavelength band of 400 to 700 nm is measured with a UV-visible spectrophotometer.

The aforementioned suitable transmittance means the minimum value of the transmittance in the aforementioned wavelength band.

If the transmittance in the wavelength band of 400 to 700 nm, which is typical light in the visible light wavelength band, is 90% or more, in the case that the transparent electrode in the sensing region of the touch panel (touch sensor) is protected, or in the case that the metal layer in the frame region of the touch panel (touch sensor) (for example, a layer having a copper layer formed on an ITO electrode) is protected and the protective film is seen from the end of the sensing region, a reduction in the image display quality, the color and the luminance in the sensing region can be sufficiently prevented.

The photosensitive resin composition of the present embodiment can be used for forming a photosensitive layer (photosensitive film) on the base material. For example, a photosensitive layer (photosensitive film) can be formed by applying a coating solution, which is prepared by uniformly dissolving or dispersing the photosensitive resin composition in a solvent, onto the base material to form a coating film, and by drying to remove the solvent. As the solvent, heretofore known solvents can be appropriately used.

The photosensitive resin composition of the present embodiment is preferably used by forming into a photosensitive film in the same manner as the photosensitive layer 20 of the photosensitive element 1. By laminating the photosensitive film on the base material for a touch panel, a roll-to-roll process can be easily implemented. In this case, it is possible to significantly contribute to the shortening of the manufacturing process and the cost reduction, for example, in such a way that the solvent drying step can be shortened.

The photosensitive layer 20 of the photosensitive element 1 can be formed by preparing a coating solution containing the photosensitive resin composition of the present embodiment, applying it onto the support film 10 and drying. The coating solution can be obtained by uniformly dissolving or dispersing each component forming the aforementioned photosensitive resin composition of the present embodiment in a solvent. The solvent is not particularly limited, and known solvents can be used.

The thickness of the photosensitive layer is, in terms of the dry thickness, preferably 10 µm or less, more preferably 1 µm or more and 9 µm or less, further preferably 1 µm or more and 8 µm or less, particularly preferably 2 µm or more and 8 µm or less, extremely preferably 3 µm or more and 8 µm or less, so that the difference in level on the surface of the touch panel (touch sensor), caused by the formation of the cured product (such as a cured film), is minimized as much as possible.

In the present embodiment, the minimum value of the visible light transmittance (for example, the transmittance at 400 to 700 nm) in the photosensitive layer 20 is preferably 90% or more, more preferably 91% or more, further preferably 92% or more.

The viscosity of the photosensitive layer 20 at 30° C. is preferably 15 to 100 MPa·s, more preferably 20 to 90 MPa·s, further preferably 25 to 80 MPa·s, from the viewpoint of preventing the elution of the photosensitive resin composition from the end faces of the photosensitive element 1 for 1 month or longer, and from the viewpoint of preventing the exposure failure during irradiation with active light, undevelopment, and the like caused by fragments of the photosensitive resin composition adhering to the substrate during cutting of this photosensitive element 1, if the photosensitive element is made to have a roll shape.

The aforementioned viscosity is a value obtained by using a circular film formed from the photosensitive resin composition and having a diameter of 7 mm and a thickness of 2 mm as a sample for measurement, by measuring the rate of change in the thickness when a load of $1.96 \times 10^{-2}$ N is applied in the thickness direction of this sample at 30° C. and 80° C., and by converting this rate of change into the viscosity on the assumption of a Newtonian fluid.

Examples of the protective film (cover film) 30 include polyethylene film, polypropylene film, polyethylene terephthalate film, polycarbonate film, polyethylene-vinyl acetate copolymer film, and laminate film composed of polyethylene-vinyl acetate copolymer film and polyethylene film.

The thickness of the protective film 30 is preferably about 5 to 100 µm, but from the viewpoint of storing as wound into a roll shape, the thickness of the protective film 30 is preferably 70 µm or less, more preferably 60 µm or less, further preferably 50 µm or less, particularly preferably 40 µm or less.

In the present embodiment, the photosensitive layer 20 composed of the photosensitive resin composition may be disposed by applying the coating solution containing the aforementioned photosensitive resin composition of the present embodiment and a solvent onto the base material for a touch panel, and drying. Also in this application, it is preferred that the photosensitive layer satisfies the aforementioned thickness (such as film thickness) or the aforementioned visible light transmittance.

<Cured Product, Touch Panel and Method of Manufacturing these>

The cured product of the present embodiment can be obtained by photo-curing the photosensitive resin composition of the present embodiment. In other words, the method of manufacturing the cured product of the present embodiment comprises a step of obtaining a cured product by photo-curing the photosensitive resin composition (such as a photosensitive resin composition layer) of the present embodiment. It is preferred that, if the photosensitive resin composition has a layered shape (photosensitive resin composition layer), the thickness of the photosensitive resin composition layer is the aforementioned thickness (thickness after drying). It is also preferred that the thickness of the cured product of the present embodiment be the same as the thickness (thickness after drying) described above for the photosensitive layer.

By forming the cured product of the present embodiment on the base material, a base material provided with a cured product can be obtained. Examples of the base material provided with a cured product include a base material for a touch panel provided with a cured product (such as a cured film) The method of manufacturing a base material for a touch panel provided with a cured product of the present embodiment may comprise a step of forming a cured product (such as a cured film) of the photosensitive resin composition layer coating part or the whole of the base material by providing a photosensitive resin composition layer containing a di(meth)acrylate compound having at least one selected from the group consisting of a dicyclopentanyl structure and a dicyclopentenyl structure on the base material for a touch panel, curing the predetermined portion of the photosensitive resin composition layer by irradiation with active light, and then removing the portion other than the predetermined portion. The method of manufacturing a base material for a touch panel provided with a cured product of the present embodiment may comprise a step of disposing the photosensitive resin composition layer on the base material by preparing the photosensitive element of the present embodiment, and by transferring the photosensitive resin composition layer of the photosensitive element to the base material.

The touch panel of the present embodiment comprises a base material (a base material for a touch panel) and the cured product of the photosensitive resin composition of the present embodiment, wherein the cured product is disposed on the base material. In other words, the touch panel of the present embodiment comprises the base material for a touch panel provided with a cured product, having the base material (the base material for a touch panel) and the cured product. The cured product may be a cured product of a photosensitive film. The method of manufacturing a touch panel of the present embodiment comprises a step of obtaining a cured product on the base material by photo-curing the photosensitive resin composition of the present embodiment.

Figure 2A:
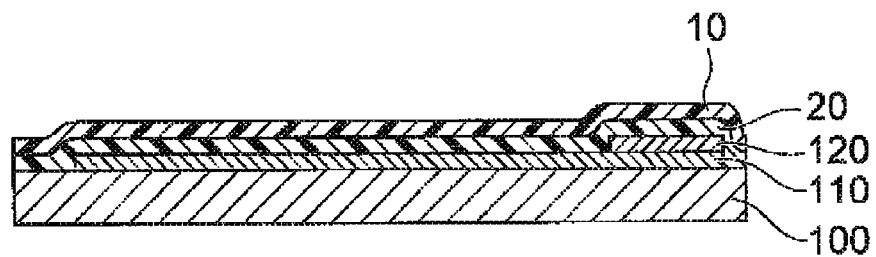
FIGS. 2A, 2B and 2C are schematic sectional views for describing one embodiment of the method of manufacturing a base material for a touch panel provided with a cured product of the present invention.
Figure 2B:
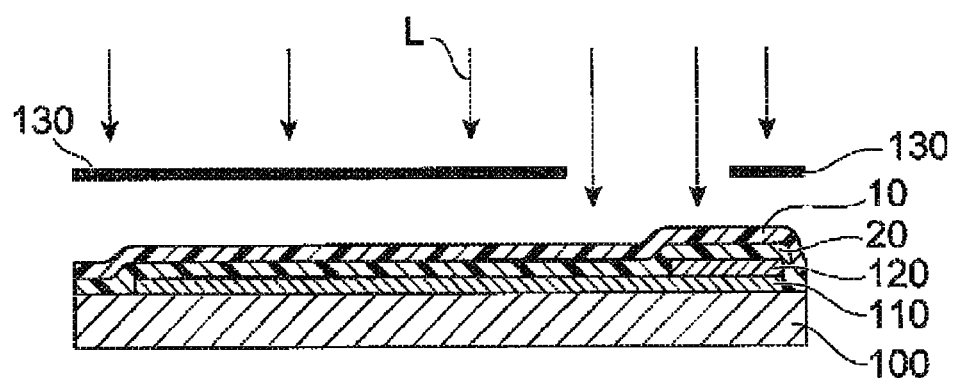
Figure 2C:
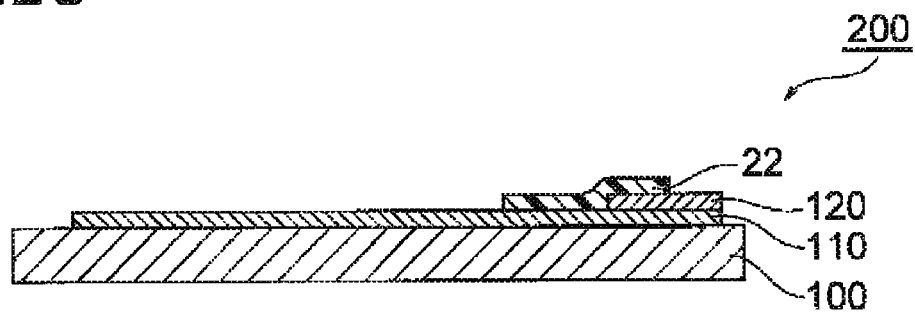

Next, a specific example of the method for forming a cured film on the base material for a touch panel is described. FIG. 2 is a schematic sectional view for describing the method of manufacturing a base material for a touch panel provided with a cured product of the present embodiment as one embodiment of the method of manufacturing a base material for a touch panel provided with a cured product.

The method of manufacturing a base material for a touch panel provided with a cured film of the present embodiment comprises: a first step (FIG. 2A) of disposing a photosensitive layer 20 containing the photosensitive resin composition of the present embodiment on a base material (a base material for a touch panel) 100 having electrodes 110 and 120 for a touch panel; a second step (FIG. 2B) of curing the predetermined portion of the photosensitive layer 20 by irradiation with active light L; and a third step (FIG. 2C) of forming a protective film 22 composed of a cured film pattern of the photosensitive resin composition coating part or the whole of the electrodes by removing the photosensitive layer of the portion other than the predetermined portion (cured portion) after the irradiation with active light. Thus, a touch panel (touch sensor) 200 provided with a protective film (cured film), which is a touch input sheet, is obtained. In the second step, the irradiation with the active light L can be performed through a photomask 130.

Examples of the base material 100 used in the present embodiment include substrates (glass plates, plastic plates, ceramic plates and the like) commonly used for touch panels (touch sensors). Examples of the constituent materials of the plastic plates include polyethylene terephthalate (PET), polycarbonate (PC) and cycloolefin polymer (COP). On this substrate, the electrodes for a touch panel are disposed, the electrodes being the objects on which a resin cured film to be as a protective film is formed. Examples of the electrodes include electrodes made of ITO, Cu, Al or Mo; and TFT. An insulation layer may be disposed on the substrate, in particular, between the substrate and the electrodes. A high refractive index layer may be disposed on the substrate.

In addition to the base material for a touch panel, a base material required to have transparency can be used. Specific examples include a base material for an optical regulation film for invisualization of electrode wiring made of ITO or the like, a base material for a plasma display panel (PDP), a base material for a liquid crystal display (LCD) module, and a base material for a flat panel display (FPD).

The base material 100 having electrodes 110 and 120 for a touch panel shown in FIG. 2 can be obtained by, for example, the following procedure. First, after metal films are sequentially formed by sputtering in the order of ITO and Cu on a base material 100 such as a PET film, a photosensitive film for etching is attached onto the metal film, a desired resist pattern is formed, unnecessary Cu is removed with an etching solution (such as an aqueous solution of ferric chloride), and then the resist pattern is removed by peeling.

In the first step to the third step, heretofore known conditions can be used. Thus, the base material for a touch panel provided with a cured film of the present embodiment can be manufactured.

Figure 3:
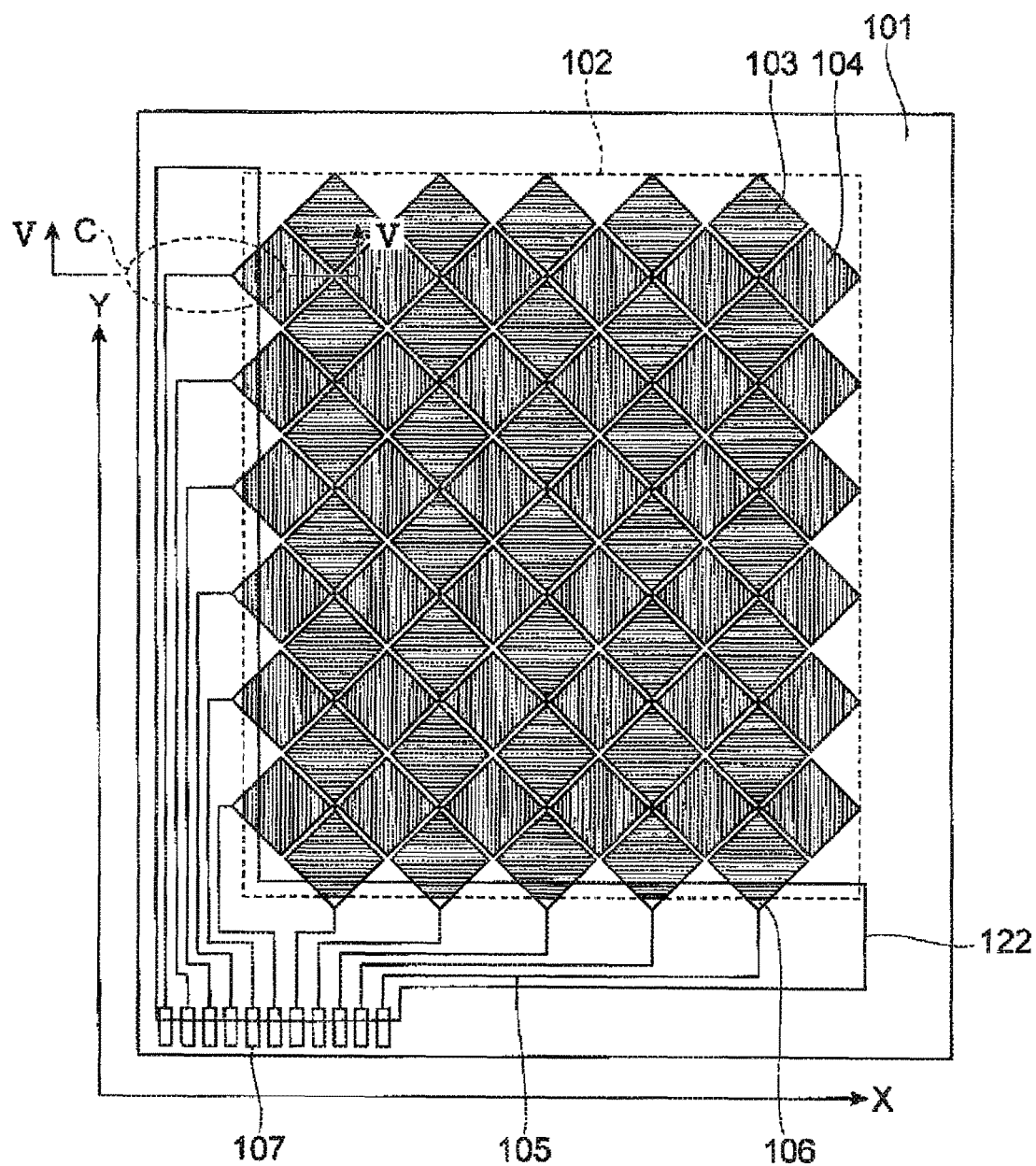
FIG. 3 is a schematic top view illustrating one example of a capacitive touch panel.
Figure 4:
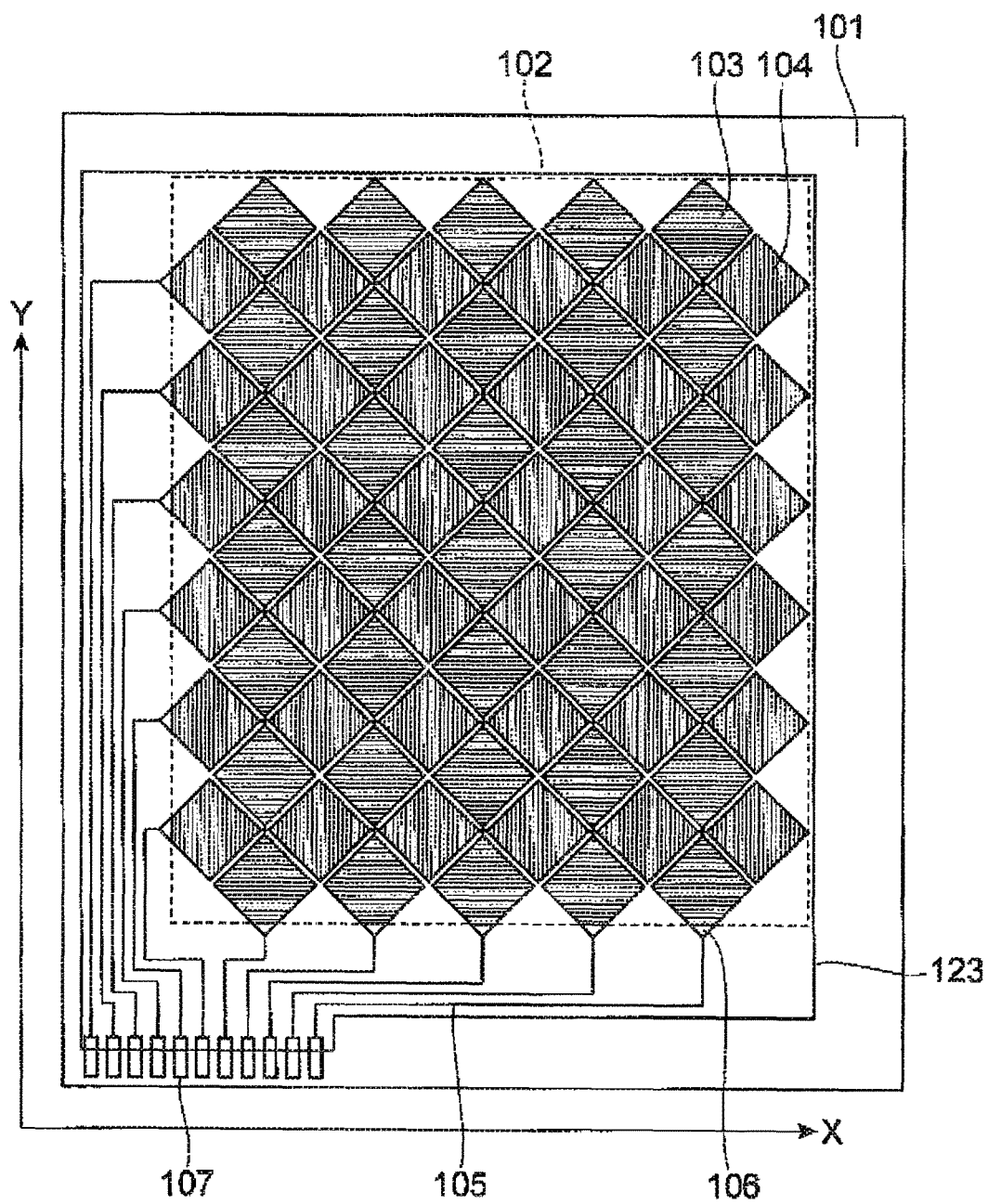
FIG. 4 is a schematic top view illustrating another example of a capacitive touch panel.

Next, one example of use site of a cured film of the present embodiment is described using FIG. 3, FIG. 4 and FIG. 5. FIG. 3 is a schematic top view illustrating one example of a capacitive touch panel. In the touch panel illustrated in FIG. 3, a touch screen 102 for detecting the coordinates of the touch location is disposed on one surface of a transparent substrate 101, and transparent electrodes 103 and transparent electrodes 104 for detecting a change in capacitance in this region are disposed on the transparent substrate 101. The transparent electrodes 103 and the transparent electrodes 104 detect the X coordinate and the Y coordinate of the touch location, respectively.

On the transparent substrate 101, drawing wirings 105 for transmitting detected signals of the touch location from the transparent electrodes 103 and the transparent electrodes 104 to an external circuit are disposed. The drawing wirings 105 are connected to the transparent electrodes 103 and the transparent electrodes 104 through connection electrodes 106 disposed on the transparent electrodes 103 and the transparent electrodes 104. Connection terminals 107 to the external circuit are disposed on the ends of the drawing wirings 105 opposite to the connection portions thereof to the transparent electrodes 103 and the transparent electrodes 104. The photosensitive resin composition, the photosensitive film and the photosensitive element of the present embodiment can be suitably used to form a protective film 122 for the drawing wirings 105, the connection electrodes 106, and the connection terminals 107. At this time, electrodes on the sensing region can also be protected at the same time. In FIG. 3, while the protective film 122 protects the drawing wirings 105, the connection electrodes 106, part of the electrodes in the sensing region, and part of the connection terminals 107, the position where the protective film is disposed may be appropriately varied. For example, as illustrated in FIG. 4, a protective film 123 may be disposed so as to completely protect the touch screen 102.

Figure 5A:
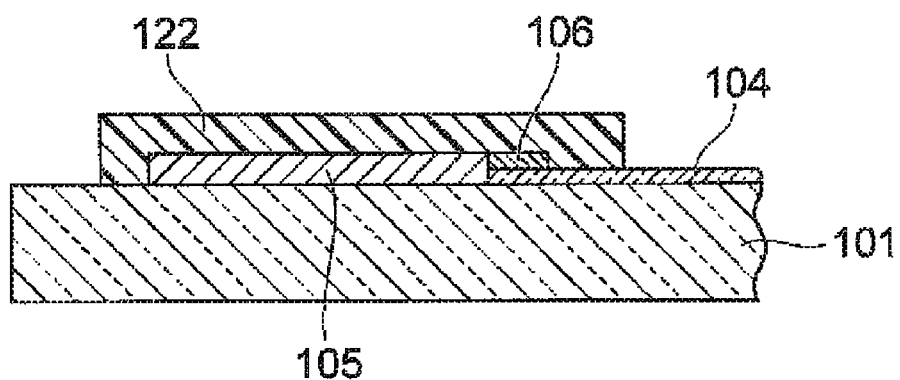
FIG. 5A is a partial sectional view of a portion C taken along line V-V shown in FIG. 3.
Figure 5B:
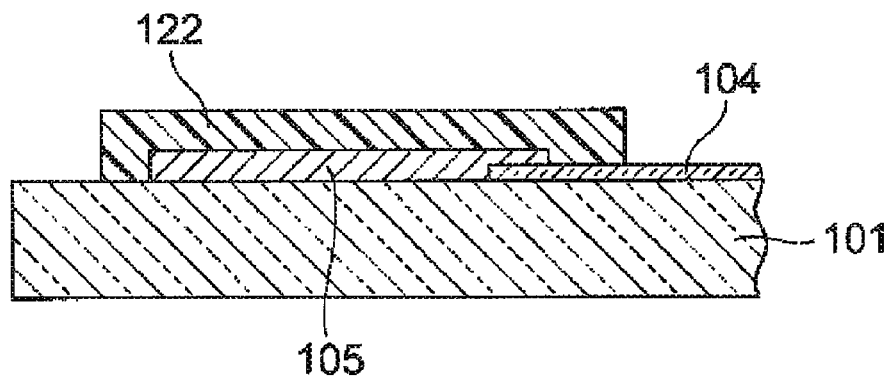
FIG. 5B is a partial sectional view illustrating another aspect thereof.

With reference to FIG. 5, the structure of the cross section of the connection portion between the transparent electrode and the drawing wiring in the touch panel illustrated in FIG. 3 is described. FIG. 5 is a partial sectional view of a portion C taken along line V-V shown in FIG. 3 and is a drawing for describing the connection portion between the transparent electrode 104 and the drawing wiring 105. As illustrated in FIG. 5A, the transparent electrode 104 and the drawing wiring 105 are electrically connected to each other through the connection electrode 106. As illustrated in FIG. 5A, part of the transparent electrode 104 and all of the drawing wiring 105 and the connection electrode 106 are covered with the protective film 122. Similarly, the transparent electrode 103 and the drawing wiring 105 are electrically connected to each other through the connection electrode 106. As illustrated in FIG. 5B, the transparent electrode 104 and the drawing wiring 105 may be directly electrically connected to each other. The photosensitive resin composition, the photosensitive film and the photosensitive element of the present invention are suitably used for formation of the resin cured film pattern as the protective film in the structural component above.

The method of manufacturing a touch panel of the present embodiment is described. First, transparent electrodes (coordinates of X position) 103 are formed on a transparent substrate 101. Successively, transparent electrodes (coordinates of Y position) 104 are formed. Formation of the transparent electrodes 103 and the transparent electrodes 104 can be performed by using, for example, a method of etching the transparent electrode layer formed on the transparent substrate 101.

Next, drawing wirings 105 for connecting to an external circuit, and connection electrodes 106 for connecting the drawing wirings 105 to the transparent electrodes 103 and the transparent electrodes 104 are formed on the surface of the transparent substrate 101. The drawing wirings 105 and the connection electrodes 106 may be formed after formation of the transparent electrodes 103 and the transparent electrodes 104 or simultaneously with formation of the respective transparent electrodes. Formation of the drawing wirings 105 and the connection electrodes 106 can be performed using, for example, etching after metal sputtering. The drawing wirings 105 can be formed, for example, using a conductive paste material containing flake silver simultaneously with formation of the connection electrodes 106 by screen printing. Next, the connection terminals 107 for connecting the drawing wirings 105 to the external circuit are formed.

The photosensitive element 1 of the present embodiment is press bonded so as to cover the transparent electrodes 103 and the transparent electrodes 104, the drawing wirings 105, the connection electrodes 106, and the connection terminals 107, formed through the steps above, thereby disposing a photosensitive layer 20 on the electrodes. Next, the transferred photosensitive layer 20 is irradiated through a photomask with active light L into a pattern of a desired shape. After irradiation with the active light L, development is performed to remove portions of the photosensitive layer 20 other than the predetermined portion (cured portion), and therefore, a protective film 122 composed of a cured product of the predetermined portion of the photosensitive layer 20 is formed. Thus, a touch panel having the protective film 122 can be manufactured.

Next, the use site of the cured film of the present embodiment is described using FIG. 6 to FIG. 10. The cured film of the present embodiment can also be suitably used as, for example, a protective film (an insulation film) 124 in FIG. 7 to FIG. 10.

Figure 6:
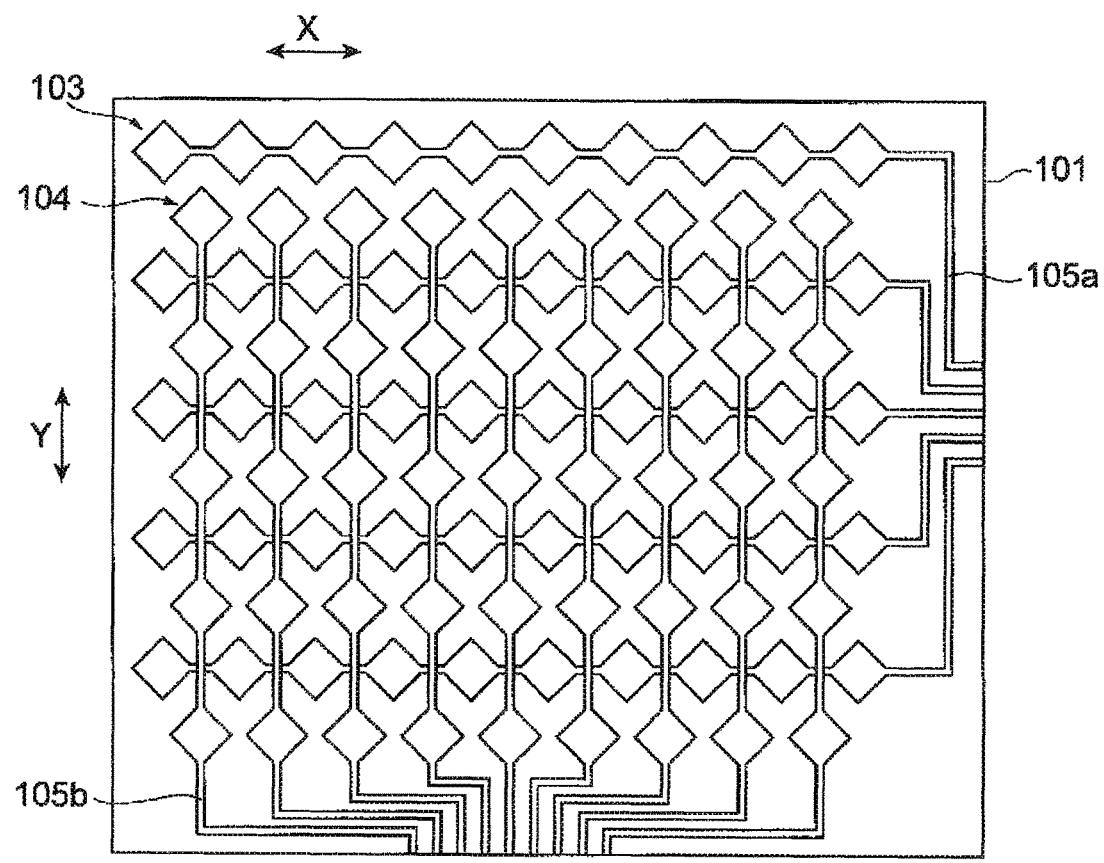
FIG. 6 is a plan view illustrating one example of a capacitive touch panel having transparent electrodes present on the same plane.
Figure 7:
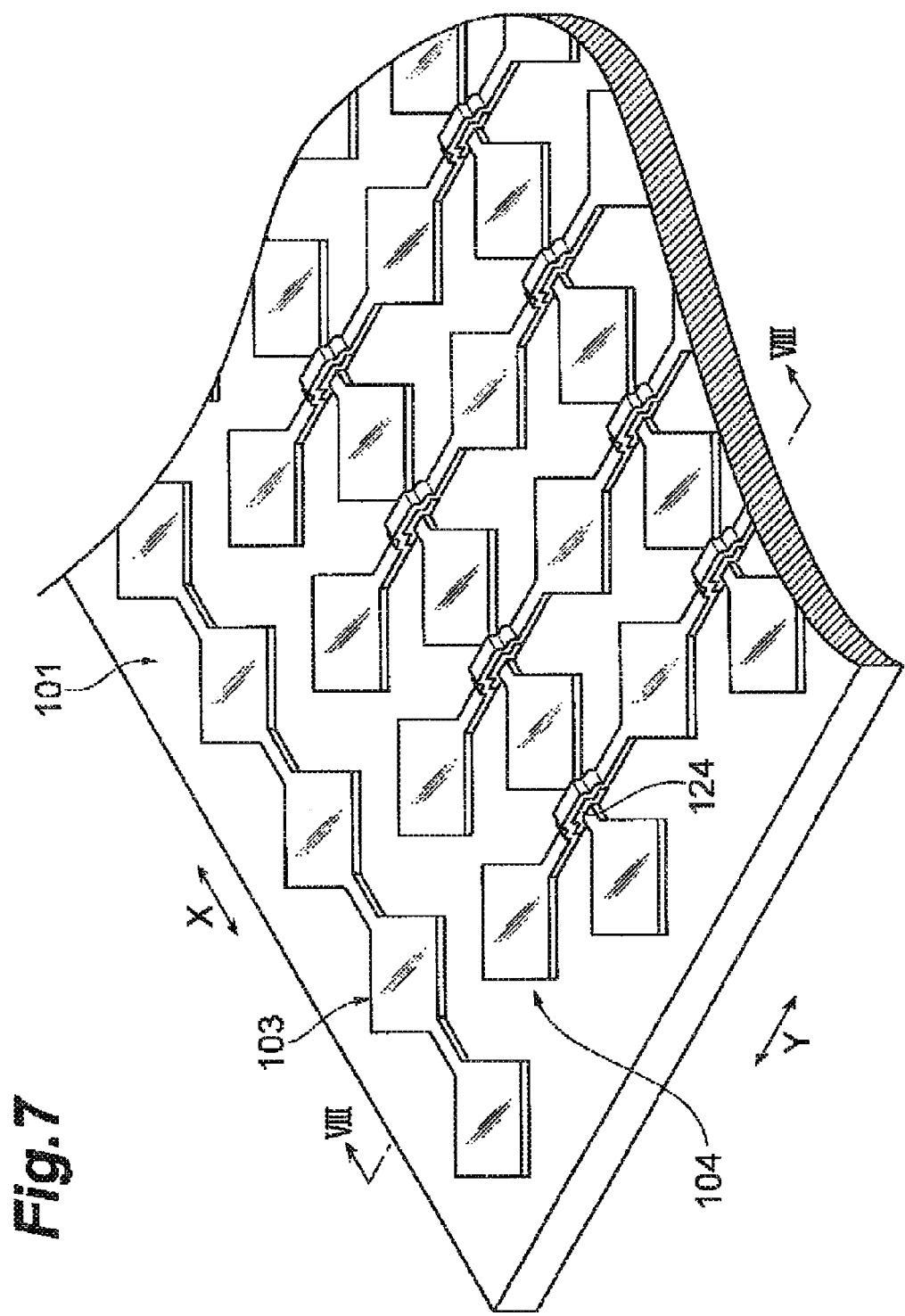
FIG. 7 is a partially cutout perspective view illustrating one example of a capacitive touch panel having transparent electrodes present on the same plane.
Figure 8:
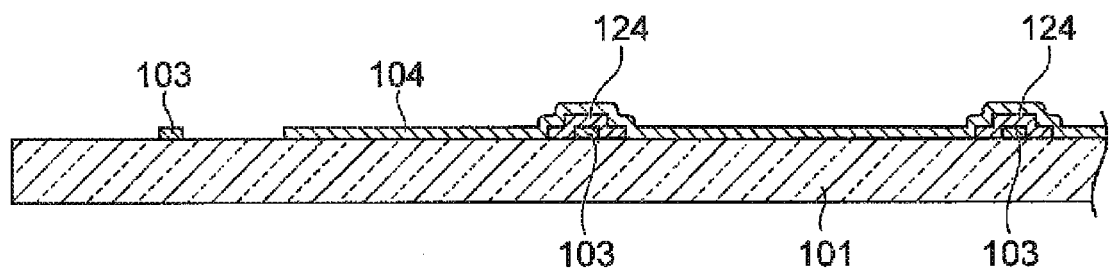
FIG. 8 is a partial sectional view taken along line VI-VI in FIG. 7.

FIG. 6 is a plan view illustrating one example of a capacitive touch panel in which transparent electrodes (coordinates of X position) 103 and transparent electrodes (coordinates of Y position) 104 are present on the same plane, and FIG. 7 is a partially cutout perspective view thereof. FIG. 8 is a partial sectional view taken along line VI-VI in FIG. 7. The capacitive touch panel has the transparent electrodes 103 detecting a change in capacitance as a coordinate of X position and the transparent electrodes 104 detecting a change in capacitance as a coordinate of Y position on a transparent substrate 101. To these transparent electrodes 103 and 104 detecting as the coordinate of X position and the coordinate of Y position, drawing wirings 105a and 105b for connecting to a control circuit of a driver element circuit (not illustrated) controlling electric signals as a touch panel are connected, respectively.

The protective film 124 is disposed on the portion in which the transparent electrodes (coordinates of X position) 103 intersect the transparent electrodes (coordinates of Y position) 104.

A method of manufacturing a capacitive touch panel in which the transparent electrodes (coordinates of X position) 103 and the transparent electrodes (coordinates of Y position) 104 are present on the same plane is described.

Figure 9A:
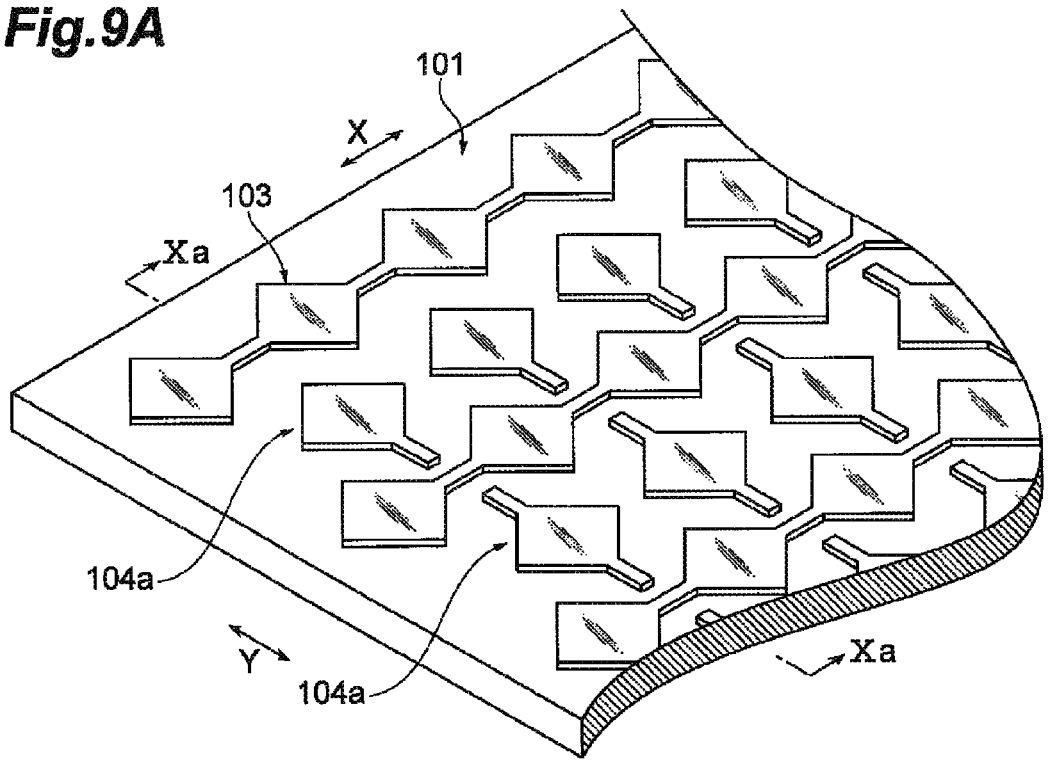
FIG. 9A and FIG. 9B are drawings for describing one example of the method of manufacturing a capacitive touch panel having transparent electrodes present on the same plane.
Figure 9B:
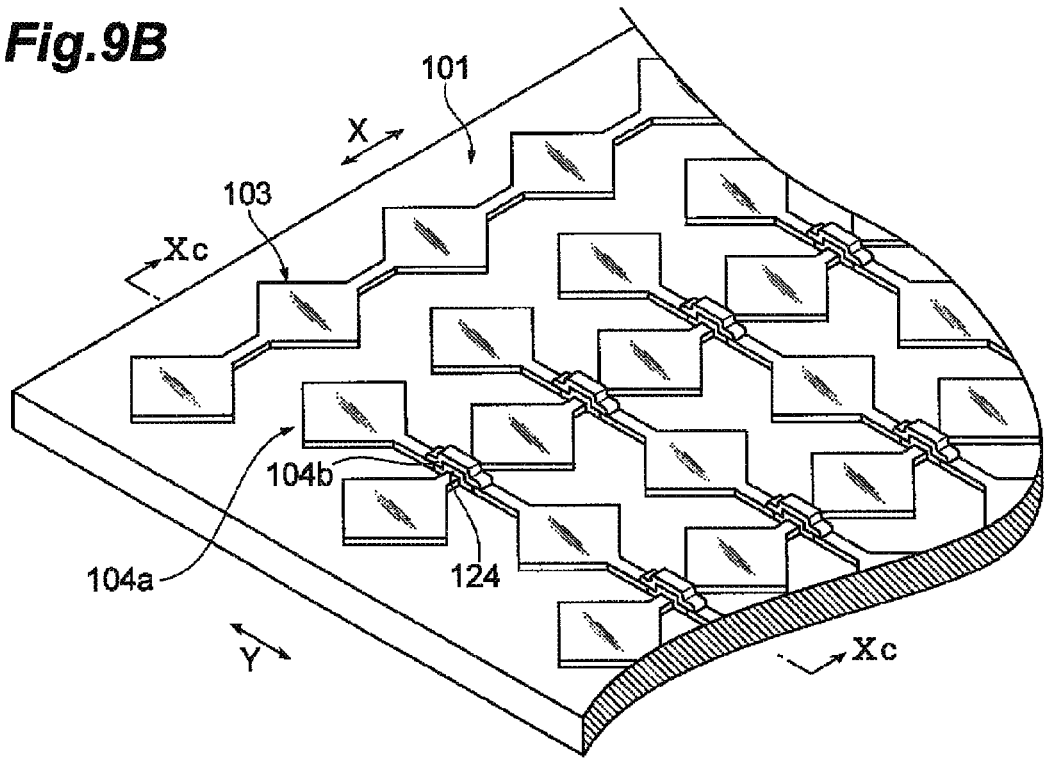

In the method of manufacturing a capacitive touch panel, for example, a substrate may be used in which the transparent electrodes (coordinates of X position) 103 and part of transparent electrodes, which later become the transparent electrodes 104 (electrode detecting the coordinate of Y position), are preliminarily formed on the transparent substrate 101 by a known method using a transparent conductive material. FIG. 9 is a drawing for describing one example of the method of manufacturing a capacitive touch panel having transparent electrodes present on the same plane; FIG. 9A is a partially cutout perspective view illustrating a substrate provided with transparent electrodes, and FIG. 9B is a partially cutout perspective view illustrating the resulting capacitive touch panel. FIG. 10 is a drawing for describing one example of the method of manufacturing a capacitive touch panel having transparent electrodes present on the same plane.

Figure 10A:
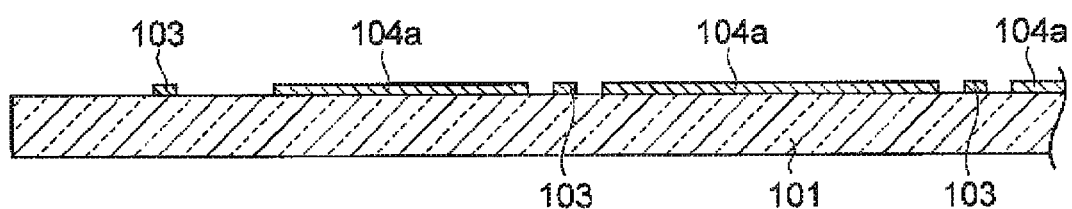
FIG. 10A, FIG. 10B and FIG. 10C are drawings for describing one example of the method of manufacturing a capacitive touch panel having transparent electrodes present on the same plane.
Figure 10B:
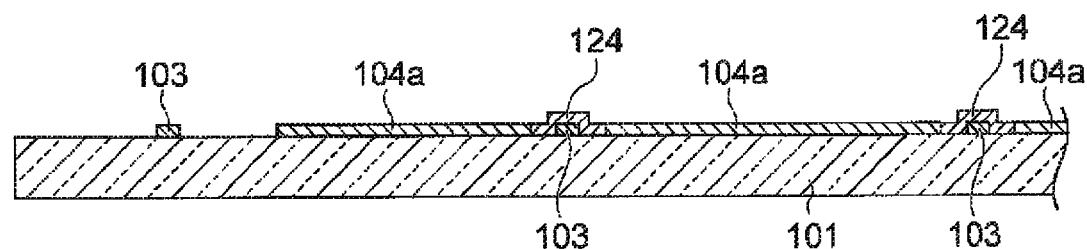
Figure 10C:
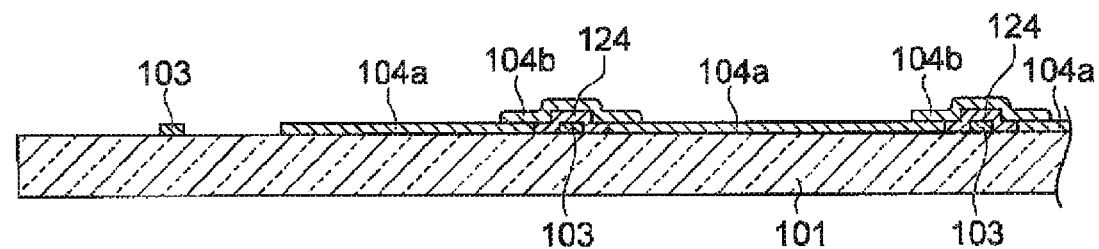

First, a substrate having transparent electrodes (coordinates of X position) 103 and parts 104a of the transparent electrodes preliminarily formed thereon as illustrated in FIG. 9A and FIG. 10A is prepared, and a protective film 124 is disposed on parts of the transparent electrodes 103 (portions between parts 104a of the transparent electrodes) (FIG. 10B). Subsequently, a conductive pattern is formed by a known method. This conductive pattern can form bridge portions 104b of the transparent electrodes (FIG. 10C). The parts 104a of the transparent electrodes preliminarily formed can be conducted each other by these bridge portions 104b of the transparent electrodes, and therefore, the transparent electrodes (coordinates of Y position) 104 are formed.

The transparent electrodes preliminarily formed may be formed by, for example, a known method using ITO and the like. The drawing wirings 105a and 105b can be formed by known methods using a transparent conductive material or a metal such as Cu and Ag. Alternatively, a substrate having the drawing wirings 105a and 105b preliminarily formed thereon may be used.

Figure 11:
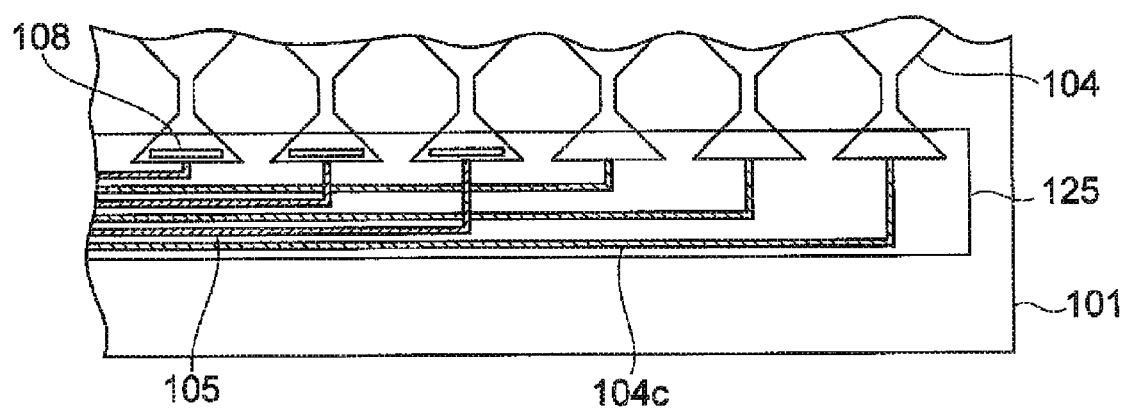
FIG. 11 is a partial sectional view illustrating one example of the touch panel having an insulation film disposed on a transparent electrode wiring and a drawing wiring disposed thereon, the transparent electrode wiring being connected to the drawing wiring via an opening.

FIG. 11 is a partial plan view illustrating one example of another capacitive touch panel. The configuration illustrated in FIG. 11 is intended for a reduction in the frame of the touch panel. In FIG. 11, a transparent insulating film 125 is disposed on the transparent electrode wirings 104c extending from the transparent electrodes 104 on the transparent substrate 101, and additionally, the drawing wirings 105 are disposed on the transparent insulating film 125. Openings 108 are formed above and below the necessary portion of the transparent insulating film 125, and the transparent electrodes 104 and the drawing wirings 105 are connected and conducted to each other. The photosensitive resin composition, the photosensitive film and the photosensitive element of the present embodiment are suitably used for the resin cured film pattern as a partial insulation film of the structure above.

EXAMPLES

The present invention is more specifically described with reference to Examples. However, the present invention is not limited to following Examples.

(Preparation of Binder Polymer Solution (A1))

In a flask equipped with a stirrer, a reflux condenser, an inert gas introducing port, and a thermometer, (1) shown in Table 1 was placed. Next, it was heated under a nitrogen gas atmosphere to 80° C.; (2) shown in Table 1 was uniformly added dropwise over 4 hours while the reaction temperature was being maintained at 80° C.±2° C. After dropwise addition of (2), stirring was continued at 80° C.±2° C. for 6 hours to obtain a solution (solid content: 45% by mass) (A1) of a binder polymer having a weight average molecular weight of about 65000, an acid value of 78 mgKOH/g and a hydroxyl value of 2 mgKOH/g.

TABLE 1

|     |                               | Mixing amount (parts by mass) (A1) |
|-----|-------------------------------|------------------------------------|
| (1) | Propylene glycol monomethyl ether | 62                             |
|     | Toluene                       | 62                                 |
| (2) | Methacrylic acid              | 12                                 |
|     | Methyl methacrylate           | 58                                 |
|     | Ethyl acrylate                | 30                                 |
|     | 2,2'-Azobis(isobutyronitrile) | 1.5                                |
|     | Weight average molecular weight | 65,000                           |
|     | Hydroxyl value (mgKOH/g)      | 2                                  |
|     | Acid value (mgKOH/g)          | 78                                 |
|     | Tg (° C.)                     | 60                                 |

The weight average molecular weight (Mw) was measured by gel permeation chromatography (GPC), and was derived from conversion using calibration curves of standard polystyrenes. The conditions on GPC are shown below.

[GPC Conditions]

Pump: Hitachi L-6000 (manufactured by Hitachi, Ltd., product name)

Columns: Gelpack GL-R420, Gelpack GL-R430, and Gelpack GL-R440 (manufactured by Hitachi Chemical Company, Ltd., product names)

Eluent: tetrahydrofuran

Measurement temperature: 40° C.

Flow rate: 2.05 mL/min

Detector: Hitachi L-3300 RI (manufactured by Hitachi, Ltd., product name)

[Method of Measuring Acid Value]

The acid value was measured as follows. First, a solution of a binder polymer was heated at 130° C. for 1 hour to remove volatile components, to obtain the solid content. After 1 g of a polymer whose acid value was to be measured was precisely weighed, 30 g of acetone was added to the polymer to uniformly dissolve the polymer. Next, a proper amount of phenolphthalein as an indicator was added to the solution, and titration was performed with a 0.1 N aqueous solution of KOH. Then, the acid value was calculated from the following expression.

acid value=$0.1 \times Vf \times 56.1/(Wp \times I/100)$

In the expression, Vf represents the volume (mL) of the aqueous solution of KOH used in titration; Wp represents the mass (g) of the resin solution measured; and I represents the proportion (% by mass) of the non-volatile component in the resin solution measured.

[Method of Measuring Hydroxyl Value]

The hydroxyl value was measured as follows. First, a solution of a binder polymer was heated at 130° C. for 1 hour to remove volatile components, to obtain the solid content. After 1 g of a polymer whose hydroxyl value was to be measured was precisely weighed, the precisely weighed polymer was placed in an Erlenmeyer flask, 10 mL of a 10% by mass solution of acetic anhydride in pyridine was added to uniformly dissolve the polymer, and heating was performed at 100° C. for 1 hour. After heating, 10 mL of water and 10 mL of pyridine were added, heating was performed at 100° C. for 10 minutes, and then, neutralization titration was performed with the ethanol solution of 0.5 mol/L potassium hydroxide using an automatic titrator (manufactured by Hiranuma Sangyo Co., Ltd., "COM-1700"). Then, the hydroxyl value was calculated from the following expression.

hydroxyl value=$(A-B) \times f \times 28.05/\text{sample}(g)+\text{acid value}$

In the expression, A represents the volume (mL) of the ethanol solution of 0.5 mol/L potassium hydroxide used in the blank test; B represents the volume (mL) of the ethanol solution of 0.5 mol/L potassium hydroxide used in titration; and f represents a factor.

Examples 1 to 8 and Comparative Examples 1 to 5

[Preparation of Coating Solutions Containing Photosensitive Resin Composition]

The materials shown in Table 2 or Table 3 were dissolved in methyl ethyl ketone, and mixing was performed by using a stirrer for 15 minutes to prepare a coating solution containing a photosensitive resin composition.

[Preparation of Photosensitive Elements]

As the support film, a polyethylene terephthalate film having a thickness of 50 μm was used. The coating solutions prepared above (the coating solutions containing a photosensitive resin composition) were uniformly applied onto the support film with a comma coater, the solvent was removed by drying with a 100° C. hot air convection dryer for 3 minutes to form a photosensitive layer (photosensitive resin composition layer, photosensitive film) composed of the photosensitive resin composition. The thickness of the obtained photosensitive layers was 5 μm.

Next, a polyethylene film having a thickness of 25 μm as a cover film was attached onto the obtained photosensitive layers to prepare a photosensitive element.

[Measurement of Moisture Permeability]

The obtained photosensitive elements was laminated on a No. 5C filter paper (manufactured by Advantec) so as for the photosensitive layer to be brought into contact with the filter paper under the conditions that the roll temperature was 80° C., the substrate conveying speed of 0.6 m/min, and the press bonding pressure (cylinder pressure) of 0.5 MPa; thus, there were prepared laminates in which the photosensitive layer and the polyethylene terephthalate film were laminated on the No. 5C filter paper.

After the preparation of the laminates obtained above, by using a parallel light exposure machine (manufactured by ORC Manufacturing Co., Ltd., EXM1201), irradiation with ultraviolet light was performed from vertically above the surface of the polyethylene terephthalate film with an exposure light quantity of $5 \times 10^2$ J/m² (a value measured at the i-line (wavelength: 365 nm))

Next, after the support film laminated on the photosensitive layer was removed by peeling, irradiation with ultraviolet light was performed from above the photosensitive layer side with an exposure light quantity of $1 \times 10^4$ J/m² (a value measured at the i-line (wavelength: 365 nm)); thus, moisture permeability measurement samples having a cured product of the photosensitive layer of 5 μm in thickness formed therein were obtained.

Next, with reference to JIS (Z0208), a cup method was performed as measurement of moisture permeability. 20 g of dried calcium chloride was placed in a cup for measurement, and covering is performed with a circular sample cut from the measurement samples into a size of 70 mm in diameter with scissors; it was allowed to stand in a thermo-hygrostat under the conditions of 60° C. and 90% RH for 24 hours.

The moisture permeability was calculated from the mass change between before and after being allowed to stand, and the moisture permeability was evaluated according to the following standards. The measurement results are shown in Table 4 and Table 5.

A: Moisture permeability ≤350 (g/m²·24 h)
B: 350<Moisture permeability ≤450 (g/m²·24 h)
C: Moisture permeability >450 (g/m²·24 h)

[Salt Water Spray Test of Cured Film (Artificial Sweat Resistance Evaluation Test)]

While the polyethylene film of the obtained photosensitive elements was being peeled, lamination was performed so as for the photosensitive layer to be brought into contact with the polyimide film with sputtered copper (manufactured by Toray Advanced Film Co., Ltd.) by using a laminator (manufactured by Hitachi Chemical Company, Ltd., trade name: HLM-3000) under the conditions of a roll temperature of 120° C., a substrate conveying speed of 1 m/min, the press bonding pressure (cylinder pressure) of $4 \times 10^5$ Pa (a substrate of 1 mm in thickness, 10 cm in length×10 cm in width was used, accordingly the linear load was $9.8 \times 10^3$ N/m in this case); thus, there were prepared laminates in which a photosensitive layer and a support film were laminated on the sputtered copper.

Next, by using a parallel light exposure machine (manufactured by ORC Manufacturing Co., Ltd., EXM1201), the photosensitive layer of the obtained laminates was irradiated with ultraviolet light from above the photosensitive layer side with an exposure light quantity of $5 \times 10^2$ J/m² (a value measured at the i-line (wavelength: 365 nm)); then, the support film was removed by peeling. Additionally, irradiation was performed with ultraviolet light from above the photosensitive layer side with an exposure light quantity of $1 \times 10^4$ J/m² (a value measured at the i-line (wavelength: 365 nm)), and it was allowed to stand for 30 minutes in a box-type dryer (manufactured by Mitsubishi Electric Corporation, model number: NV50-CA) heated to 140° C. Thus, there were obtained samples for the artificial sweat resistance evaluation in which a cured film having a thickness of 5.0 μm was formed.

Next, with reference to JIS (Z 2371), by using a salt water spray tester (manufactured by Suga Test Instruments Co., Ltd., STP-90V2), the aforementioned samples was placed in a test tank, and a salt water having a concentration of 50 g/L (pH=6.7) was sprayed at a test tank temperature of 35° C. and an amount of spray of 1.5 mL/h for 48 hours. After completion of spraying, the salt water was wiped off, the state of the surface of the samples for evaluation was observed and evaluated according to the following evaluation standards. The measurement results are shown in Table 4 and Table 5.

A: No change is found on the surface of the cured film.
B: Slight traces are found on the surface of the cured film, but copper does not change.
C: Traces are found on the surface of the cured film, but copper does not change.
D: Traces are found on the surface of the cured film, and copper is discolored.

[Measurement of Transmittance of Cured Film]

While the polyethylene film (cover film) of the obtained photosensitive elements was being peeled, lamination was performed so as for the photosensitive layer to be brought into contact with the glass substrate having a thickness of 1 mm by using a laminator (manufactured by Hitachi Chemical Company, Ltd., trade name: HLM-3000) under the conditions of a roll temperature of 120° C., a substrate conveying speed of 1 m/min, the press bonding pressure (cylinder pressure) of $4 \times 10^5$ Pa (a substrate of 1 mm in thickness, 10 cm in length×10 cm in width was used, accordingly the linear load was $9.8 \times 10^3$ N/m in this case); thus, there were prepared laminates in which a photosensitive layer and a support film were laminated on the glass substrate.

Next, by using a parallel light exposure machine (manufactured by ORC Manufacturing Co., Ltd., EXM1201), the photosensitive layer of the obtained laminates was irradiated with ultraviolet light from above the photosensitive layer side with an exposure light quantity of $5 \times 10^2$ J/m² (a value measured at the i-line (wavelength: 365 nm)); then, the support film was removed. Additionally, it was allowed to stand for 30 minutes in a box-type dryer heated to 140° C. (manufactured by Mitsubishi Electric Corporation, model number: NV50-CA), and thus there were obtained samples for transmittance measurement provided with a cured film having a thickness of 5 μm.

Next, the visible light transmittance (unit: %) of the obtained samples in the wavelength region of 400 to 700 nm for the measurement was measured by using an ultraviolet-visible spectrophotometer (U-3310) manufactured by Hitachi High-Technologies Corp., and the minimum value was calculated. Measurement results are shown in Table 4 and Table 5.

TABLE 2

| | Material name | Example 1 | Example 2 | Example 3 | Example 4 | Example 5 | Example 6 | Example 7 | Example 8 |
|---|---|---|---|---|---|---|---|---|---|
| Component A | (A1) | 60 | 60 | 60 | 60 | 60 | 60 | 60 | 60 |
| Component B | A-DCP | 40 | 40 | 30 | 20 | 40 | 40 | 40 | 40 |
| | T-1420 (T) | — | — | 10 | 20 | — | — | — | — |
| | A-DOG | — | — | — | — | — | — | — | — |
| | BPE100 | — | — | — | — | — | — | — | — |
| | BPE200 | — | — | — | — | — | — | — | — |
| | FA321M | — | — | — | — | — | — | — | — |
| Component C | OXE01 | 1.7 | — | — | — | — | — | — | — |
| | NCI-930 | — | 0.8 | 0.8 | 0.8 | 1.7 | — | 1.7 | — |
| | N-1919 | — | — | — | — | — | 0.75 | 0.2 | — |
| | DFI-091 | — | — | — | — | — | — | — | 1.7 |
| Component D | B-6030 | 0.4 | 0.4 | 0.4 | 0.4 | 0.4 | 0.4 | 0.4 | 0.4 |
| Component E | PM21 | 0.25 | 0.25 | 0.25 | 0.25 | 0.25 | 0.25 | 0.25 | 0.25 |
| Others | AW500 | 0.1 | 0.1 | 0.1 | 0.1 | 0.1 | 0.1 | 0.1 | 0.1 |
| | ADDITIVE8032 | 0.07 | 0.07 | 0.07 | 0.07 | 0.07 | 0.07 | 0.07 | 0.07 |

TABLE 3

|  | Material name | Comparative Example 1 | Comparative Example 2 | Comparative Example 3 | Comparative Example 4 | Comparative Example 5 |
|---|---|---|---|---|---|---|
| Component A | (A1) | 60 | 60 | 60 | 60 | 60 |
| Component B | A-DCP | — | — | — | — | — |
|  | T-1420 (T) | 40 | — | — | — | — |
|  | A-DOG | — | 40 | — | — | — |
|  | BPE100 | — | — | 40 | — | — |
|  | BPE200 | — | — | — | 40 | — |
|  | FA321M | — | — | — | — | 40 |
| Component C | OXE01 | 1.7 | 1.7 | 1.7 | 1.7 | 1.7 |
|  | NCI-930 | — | — | — | — | — |
|  | N-1919 | — | — | — | — | — |
|  | DFI-091 | — | — | — | — | — |
| Component D | B-6030 | 0.4 | 0.4 | 0.4 | 0.4 | 0.4 |
| Component E | PM21 | 0.25 | 0.25 | 0.25 | 0.25 | 0.25 |
| Others | AW500 | 0.1 | 0.1 | 0.1 | 0.1 | 0.1 |
|  | ADDITIVE8032 | 0.07 | 0.07 | 0.07 | 0.07 | 0.07 |

The symbols for the components in Table 2 and Table 3 represent the following meanings.

Component (A)

(A1): A propylene glycol monomethyl ether/toluene solution of a copolymer having a monomer mixing ratio (methacrylic acid/methyl methacrylate/ethyl acrylate=12/58/30 (mass ratio)); weight average molecular weight: 65000, acid value: 78 mgKOH/g, hydroxyl value: 2 mgKOH/g, Tg: 60° C.

Component (B)

A-DCP (manufactured by Shin-Nakamura Chemical Co., Ltd., trade name, compound represented by the formula (5) below, p=q=0, n=m=1, X=dicyclopentanyl group in the general formula (1) above)

[Chemical Formula 12]

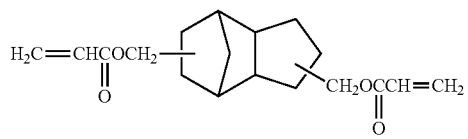

(5)

T-1420(T): Ditrimethylolpropane tetraacrylate (manufactured by Nippon Kayaku Co., Ltd.)

A-DOG: Dioxane glycol diacrylate (manufactured by Shin-Nakamura Chemical Co., Ltd.)

BPE-100: Ethoxylated bisphenol A methacrylate, EO 2.6 mol (manufactured by Shin-Nakamura Chemical Co., Ltd.)

BPE-200: Ethoxylated bisphenol A methacrylate, EO 4.0 mol (manufactured by Shin-Nakamura Chemical Co., Ltd.)

FA-321M: EO-modified bisphenol A dimethacrylate, EO 10 mol (manufactured by Hitachi Chemical Company, Ltd.)

Component (C)

IRGACURE OXE01: 1-[4-(Phenylthio)phenyl]-1,2-octanedione 2-(O-benzoyloxime) (manufactured by BASF SE)

NCI-930: Adeka Arkls NCI-930 (formula (2-1) above, manufactured by Adeka Corp.)

N-1919: Adeka Optomer N-1919 (formula (4-1) above, manufactured by Adeka Corp.)

DFI-091: manufactured by Daito Chemix Corp. (formula (3-1) above)

Component (D)

B-6030: 5-Amino-1H-tetrazole (manufactured by Chiyoda Chemical Co., Ltd., trade name: thioale B-6030)

Component (E)

PM21: Photopolymerizable unsaturated bond-containing phosphoric acid ester (ethyleneoxide-modified dimethacrylate phosphate, manufactured by Nippon Kayaku Co., Ltd.)

Others

AW500: Antage W-500, 2,2'-methylene-bis(4-ethyl-6-tert-butylphenol) (manufactured by Kawaguchi Chemical Industry Co., Ltd.)

ADDITIVE8032: Silicone leveling agent (manufactured by Dow Corning Toray Co., Ltd.)

Methyl ethyl ketone: manufactured by Tonen Chemical Corp.

TABLE 4

|  | Example 1 | Example 2 | Example 3 | Example 4 | Example 5 | Example 6 | Example 7 | Example 8 |
|---|---|---|---|---|---|---|---|---|
| Film thickness (μm) | 5 | 5 | 5 | 5 | 5 | 5 | 5 | 5 |
| Moisture permeability | A | A | A | A | A | A | A | A |
| Salt water spray test | A | A | A | A | A | A | A | A |
| Minimum value of transmittance in 400 to 700 nm | 91.92 | 91.99 | 91.6 | 92 | 91.98 | 91.93 | 91.6 | 91.8 |

TABLE 5

| | Comparative Example 1 | Comparative Example 2 | Comparative Example 3 | Comparative Example 4 | Comparative Example 5 |
|---|---|---|---|---|---|
| Film thickness (μm) | 5 | 5 | 5 | 5 | 5 |
| Moisture permeability | B | B | C | C | C |
| Salt water spray test | A | B | D | D | D |
| Minimum value of transmittance in 400 to 700 nm | 92.09 | 91.93 | 91.87 | 91.92 | 91.86 |

In Examples 1 to 8 in which di(meth)acrylate compound (formula (5) above) having a dicyclopentanyl structure was used as the component (B) shown in Table 3, it was able to achieve the compatibility between the low moisture permeability and the high rust preventive property (salt water spray test) while attaining high transparency at the film thickness (thickness of cured film) of 5 μm.

On the other hand, in Comparative Example 1, relatively high rust preventive property (salt water spray test) was able to be obtained, but moisture permeability is relatively high, and therefore, the compatibility between low moisture permeability and high rust preventive property was not able to be achieved. In Comparative Examples 2 to 5, the compatibility between low moisture permeability and high rust preventive property (salt water spray test) was not able to be achieved.

From the above, a photosensitive resin composition containing a di(meth)acrylate compound having a dicyclopentanyl structure can effectively reduce the rust of the transparent electrodes.

REFERENCE SIGNS LIST

1 . . . Photosensitive element, 10 . . . Support film, 20 . . . Photosensitive layer, 22 . . . Protective film, 30 . . . Protective film, 100 . . . Base material, 101 . . . Transparent substrate, 102 . . . Touch screen, 103 . . . transparent electrode (coordinates of X position), 104 . . . transparent electrode (coordinates of Y position), 104a . . . Part of transparent electrode, 104b . . . Bridge portion of transparent electrode, 104c . . . transparent electrode wiring, 105, 105a, 105b . . . Drawing wiring, 106 . . . Connection electrode, 107 . . . Connection terminal, 108 . . . Opening, 110, 120 . . . electrodes for a touch panel, 122, 123, 124 . . . Protective film, 125 . . . Transparent insulating film, 130 . . . Photomask, 200 . . . Base material for touch panel provided with protective film, L . . . Active light.

What is claimed is:

1. A touch panel, comprising:
    a base material;
    a sensing region including at least one electrode provided over the base material; and
    a frame region provided at a periphery of the sensing region, the frame region including metal wiring provided over the base material and being electrically connected to the at least one electrode; and
    a cured product of a photosensitive resin composition disposed at least on the metal wiring,
    wherein the photosensitive resin composition contains a component (A): a binder polymer, a component (B): a photopolymerizable compound, and a component (C): a photopolymerization initiator; and
    the component (B) includes a di(meth)acrylate compound having at least one selected from the group consisting of a dicyclopentanyl structure and a dicyclopentenyl structure.

2. The touch panel according to claim 1, wherein the di(meth)acrylate compound is a compound represented by the following general formula (1):

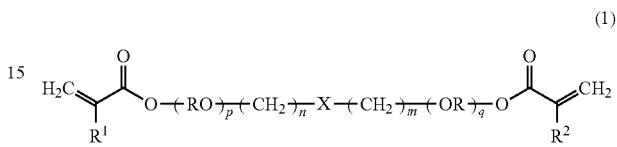

wherein in the general formula (1), X represents a dicyclopentanyl structure or a dicyclopentenyl structure; R each independently represents an alkylene group having 1 to 4 carbon atoms; $R^1$ and $R^2$ each independently represent a hydrogen atom or a methyl group; and n and m each independently represent 0 to 2; and p+q is 0 to 10.

3. The touch panel according to claim 1, wherein the di(meth)acrylate compound includes at least one compound selected from the group consisting of dimethylol tricyclodecane di(meth)acrylate and tricyclodecanediol di(meth)acrylate.

4. The touch panel according to claim 1, wherein the photosensitive resin composition further contains at least one compound selected from the group consisting of a triazole compound, a thiadiazole compound and a tetrazole compound.

5. The touch panel according to claim 1, wherein the component (C) includes an oxime ester compound.

6. The touch panel according to claim 5, wherein the oxime ester compound includes a compound represented by the general formula (2) below:

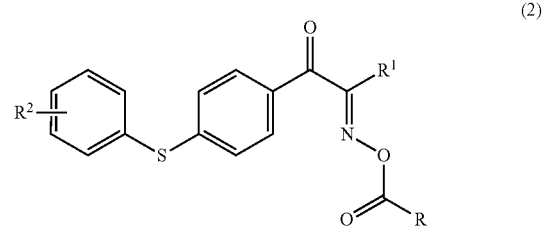

wherein, in the general formula (2), R and $R^1$ each represent an alkyl group having 1 to 12 carbon atoms, a cycloalkyl group having 4 to 10 carbon atoms, a phenyl group or a tolyl group, and $R^2$ represents non-substitution, OH, COOH, $O(CH_2)OH$, $O(CH_2)_2OH$, $COO(CH_2)OH$ or $COO(CH_2)_2OH$.

7. The touch panel according to claim 5, wherein the oxime ester compound includes a compound represented by the general formula (3) below:

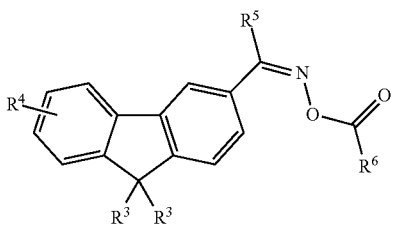
(3)

wherein, in the general formula (3), $R^3$ represents an alkyl group having 1 to 6 carbon atom, $R^4$ represents $NO_2$ or ArCO, Ar represents an aryl group, $R^5$ and $R^6$ each represent an alkyl group having 1 to 12 carbon atoms, a phenyl group or a tolyl group.

8. The touch panel according to claim 5, wherein the oxime ester compound includes a compound represented by the general formula (4) below:

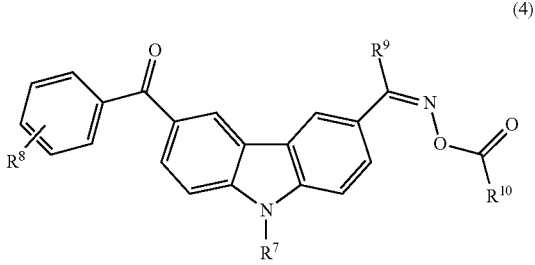
(4)

wherein, in the general formula (4), $R^7$ represents an alkyl group having 1 to 6 carbon atoms, $R^8$ is an organic group having an acetal bond, $R^9$ and $R^{10}$ are each an alkyl group having 1 to 12 carbon atoms, a phenyl group or a tolyl group.

9. The touch panel according to claim 5, wherein the component (C) further includes an aromatic ketone.

10. The touch panel according to claim 1, wherein the component (A) includes a copolymer having a constituent unit derived from (meth)acrylic acid, and a constituent unit derived from alkyl (meth)acrylate.

11. The touch panel according to claim 1, wherein acid value of the component (A) is 75 mgKOH/g or more.

12. The touch panel according to claim 1, wherein the component (B) further includes a polyfunctional vinyl monomer having three or more ethylenically unsaturated groups.

13. The touch panel according to claim 12, wherein a proportion of the polyfunctional vinyl monomer having three or more ethylenically unsaturated groups is 10 parts by mass or more with respect to 100 parts by mass of the component (B).

14. The touch panel according to claim 1, wherein a content of the component (A) is 35 to 85 parts by mass and a content of the component (B) is 15 to 65 parts by mass with respect to 100 parts by mass of a total amount of the component (A) and the component (B).

15. The touch panel according to claim 1, wherein a content of the component (C) is 0.1 to 20 parts by mass with respect to 100 parts by mass of a total amount of the component (A) and the component (B).

16. The touch panel according to claim 1, wherein the photosensitive resin composition further contains a tetrazole compound.

17. The touch panel according to claim 1, wherein the photosensitive resin composition further contains a phosphoric acid ester having a photopolymerizable unsaturated bond.

18. The touch panel according to claim 1, wherein a thickness of the cured product is 10 μm or less.

19. The touch panel according to claim 1, wherein a thickness of the cured product is 9 μm or less.

20. The touch panel according to claim 1, wherein the metal wiring has an ITO electrode, and a copper layer formed on the ITO electrode.

21. The touch panel according to claim 1, wherein the component (B) comprises dimethylol-tricyclodecane diacrylate or dimethylol-tricyclodecane dimethacrylate.

* * * * *